United States Patent [19]

Tzikas

[11] Patent Number: 4,912,244
[45] Date of Patent: Mar. 27, 1990

[54] VINYLSULFONYLALKYLAMINO-ALKYLAMINES AS INTERMEDIATES FOR THE PREPARATION OF FIBER-REACTIVE DYES

[75] Inventor: Athanassios Tzikas, Pratteln, Switzerland

[73] Assignee: Ciba-Geigy Corporation, Ardsley, N.Y.

[21] Appl. No.: 221,404

[22] Filed: Jul. 19, 1988

Related U.S. Application Data

[60] Division of Ser. No. 914,832, Oct. 2, 1986, Pat. No. 4,782,140, which is a continuation of Ser. No. 717,747, Mar. 28, 1985, abandoned.

[30] Foreign Application Priority Data

Apr. 5, 1984 [CH] Switzerland ............... 1718/84-8

[51] Int. Cl.$^4$ ............... C07C 141/04; C07C 11/04; C07C 21/04; C07C 69/14
[52] U.S. Cl. .................... 558/23; 558/25; 564/500; 534/617; 534/638; 534/641; 534/642
[58] Field of Search ............ 534/617, 638, 641, 642; 564/500; 558/25, 23

[56] References Cited

U.S. PATENT DOCUMENTS 4,754,023 6/1988 Tzikas .................. 534/618

FOREIGN PATENT DOCUMENTS 0159292 10/1985 European Pat. Off. ........... 534/617

*Primary Examiner*—Floyd D. Higel
*Attorney, Agent, or Firm*—Edward McC. Roberts

[57] ABSTRACT

Intermediate useful for the preparation of fiber-reactive dyes having the formula

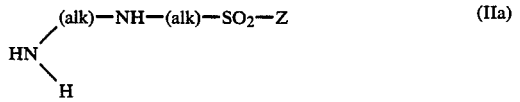

in which the alks independently of each other are $C_2$–$C_6$-alkylene and Z is $\beta$-halogenoethyl, vinyl, $\beta$-sulfatoethyl, $\beta$-thiosulfatoethyl or $\beta$-acetoxyethyl.

1 Claim, No Drawings

VINYLSULFONYLALKYLAMINO-ALKYLAMINES AS INTERMEDIATES FOR THE PREPARATION OF FIBER-REACTIVE DYES

This is a divisional of application Ser. No. 914,832, filed on Oct. 2, 1986, which issued as U.S. Pat. No. 4,782,140 on Nov. 1, 1988, which is a continuation of application Ser. No. 717,747, filed on Mar. 28, 1985, now abandoned.

The invention relates to novel useful reactive dyes of the formula I

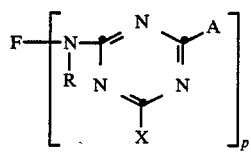

in which
F is a radical of a metal-free or metal-containing monoazo or disazo dye which contains at least one —$SO_3H$— group, a radical of a derivative of 1-aminoanthraquinone or 1-anilinoanthroquinone, in particular a radical of a 4-phenylamino-1-aminoanthraquinone-2-sulfonic acid derivative, or a radical of a sulfophthalocyanine dye, in particular of a phthalocyaninesulfanilide or -sulfalkylamide (having 2–6 C atoms in the alkyl chain) derivative which carries at least two sulfo groups in the phthalocyanine nucleus, or a radical of a formazan, phenazine, oxazine or nitroaryl dye, R is hydrogen or unsubstituted or —COOH— or —$SO_3H$— substituted alkyl having 1 to 4 C atoms, cyanoethyl or hydroxyethyl, X is fluorine, chlorine, bromine, alkylsulfonyl having 1 to 4 C-atoms, phenylsulfonyl or a —$SO_3H$— radical, p is 1 or 2 and A is a radical of the formula II

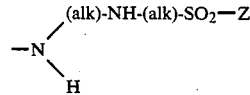

where the alks are independently of each other polymethylene radicals having 2 to 6 C atoms or their branched isomers, and in which Z is a β-halogenoethyl or a vinyl or β-sulfatoethyl or β-thiosulfatoethyl or β-acetoxyethyl radical.

Fiber-reactive dyes is to be understood as meaning dyes which are capable of reacting with the hydroxyl groups of cellulose or with the reactive centers of natural or synthetic polyamides to form covalent chemical bonds. The radical F in the formula I can come from any known class of dye, but it preferably is a member of the anthraquinone, the metal-free or metal-containing monoazo or disazo, the phthalocyanine, the formazan or nitroaryl series. Preference is given to dyes according to the invention in which F is a dye radical of the anthraquinone, the metal-free or metal-containing monoazo or disazo or the phthalocyanine series.

Preferably F contains two to four sulfur groups.

The substituent R is hydrogen or a straight-chain or branched low molecular weight alkyl group having 1 to 4 C atoms, such as methyl, ethyl, propyl, isopropyl or n-butyl, 2-methylpropyl, sec.-butyl, tert.-butyl, or is a substituted alkyl radical, such as carboxymethyl, sulfomethyl, sulfoethyl, cyanoethyl, β-chloropropyl or β-hydroxyethyl.

Preferably R is the methyl radica. Particularly preferably R is hydrogen.

Substituents X are in particular chlorine, bromine, fluorine, alkylsulfonyl, we [sic] methylsulfonyl or ethylsulfonyl, phenylsulfonyl or an —$SO_3H$ radical.

Preferably X is a chlorine or fluorine atom,

Preference is also given to reactive dyes of the formula (I) in which the alks are independently of each other other $C_{2\text{-}4}$-alkylene radicals.

The invention relates in particular to dyes of the formula I in which Z is a the β-chloroethyl radical and X is.a halogen atom.

The reactive dyes of the general formula I are prepared by . . . (sic) a dye of the formula V

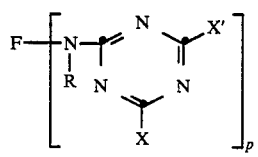

in which F, R and p are as defined above and X and X', independently of each other, have one of the meanings mentioned above for X, with an amine of the formula IIa

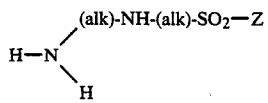

in which
alk is a polymethylene radical having 2 to 6 C atoms or its branched isomers and in which
Z is a β-halogenoethyl or a vinyl or β-sulfatoethyl or β-thiosulfatoethyl or β-acetoxyethyl radical.

The dyes of the general formula V are prepared by reacting a dye of the formula III

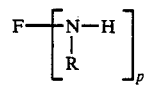

in which F, R and p are as defined above, with a reactive derivative of the 1,3,5-triazine of the formula IV

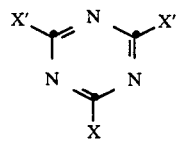

in which X and X', independently of each other, have one of the meanings mentioned above for X.

The preparation of dyes of the formula V and the reactive dyes of the formula I according to the invention can also be advantageously combined, so that first a dye of the formula III is reacted with a reactive derivative of the 1,3,5-triazine of the formula IV to give a dye of the formula V and that the latter dye, without prior isolation, is then reacted with an amine of the formula IIa or II'a to give a reactive dye of the formula I according to the invention. The reaction of the dyes of the formula III with the tri-azine derivatives of the formula IV is advantageously carried out at low temperatures, for example between −2° and +10° C., preferably between 0° and 5° C., within a pH range between 1.5 and 9, preferably between 4 and 6, in the presence of acid-binding agents, such as sodium hydroxide solution, sodium carbonate or sodium hydrogencarbonate.

The solvent used is preferably water which contains a certain amount of organic solvents, for example acetone. Yet the reaction can also be carried out in pure water.

For the further reaction of the dyes of the formula V which are obtained in this way with the amines of the formula IIa or II'a the amines are advantageously employed in the form of a salt, preferably in the form of a hydrochloride. The reaction is carried out at elevated temperature, for example between 5° and 70° C., preferably between 5° and 30° C., within a pH range from 2 to 6.5, preferably 3.5 to 4.5, in the presence of acid-binding agents, preferably sodium bicarbonate.

If the dye radical F is composed of a plurality of components, as in the case of, for example, azo dyes or formazan dyes, the dyes of the formula I according to the invention are also obtainable by building them up in a manner known per se from components of F, of which one or, if desired, two contain a group of the formula Va

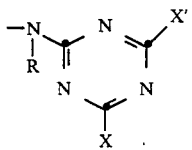
(Va)

in which R, X and X' are as defined above.

These components are obtained by acylating the corresponding components, which contain a group of the formula IIIa

(IIIa)

with a reactive triazine derivative of the formula IV under conditions which correspond to those described above in the case of the corresponding reaction of the dye. The dyes thus obtained are then reacted with an amine of the formula IIa or IIIa in the manner described above to give a dye of the formula I according to the invention.

The amines of the formula IIa or II'a where Z is a β-halogenoethyl radical are prepared by reacting an amine of the formula IIa or II'a which contains a chlorine atom in place of the —SO₂—Z group with β-hydroxyethylmercaptan in an alkaline medium and subsequently oxidizing the resulting thioether with halogen in halohydric acid solution in accordance with the teaching of German Pat. 887,505. Amines of the formula IIa or II'a in which Z is a vinyl radical can be obtained from the amines of the formula IIa or II's [sic] in which Z is β-halogenoethyl through elimination of hydrogen chloride.

An analogous method can be used to obtain dyes of the formula I according to the invention in which Z is vinyl from dyes of the formula I according to the invention in which Z is β-chloroethyl, namely through elimination of hydrogen chloride, for example by treatment at 50° to 60° C. with sodium hydrogencarbonate in water.

Reactive derivatives of the 1,3,5-triazine of the formula IV are known. Specific examples are: trichlorotriazine, tribromotriazine, trifluorotriazine, trisulfotriazine, trismethylsulfonyltriazine, trisethylsulfonyltriazine, dichlorofluorotriazine, chlorodisulfotriazine, chlorobismethylsulfonyltriazine and trisphenylsulfonyltriazine.

Examples of amines of the formula IIa are:

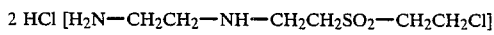

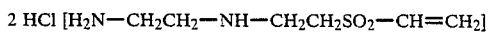

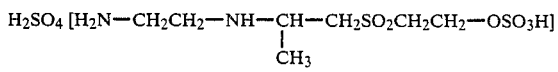

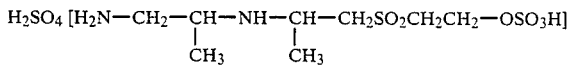

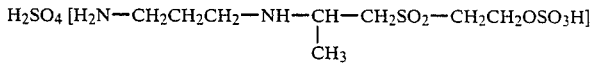

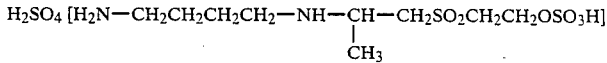

In the dyes of the formula III which are used for preparing the dyes according to the invention, F is the radical of a water-soluble dye which carries at least one sulfo group, in particular the radical of a monoazo or disazo dye, which can be metal-free or metallized; the radical of a derivative of 1-aminoanthraquinone or 1-anilinoanthraquinone, in particular the radical of a 4-phenylamino-1-aminoanthraquinone-2-sulfonic acid derivative; or the radical of a sulfophthalocyanine dye, in particular of a phthalocyanine-sulfanilide or -sulfalkylamide (having 2 to 6 C atoms in the alkyl chain) derivative which carries at least two sulfo groups in the phthalocyanine nucleus; or the radicals of formazan or nitroaryl dyes.

In an important group of dyes of the formula III,
F is the radical of a monoazo or disazo dye of the formula VIa or VIb D—N=N—(M—N=N)$_n$K—     (VIa)

or

—D—N=N—(M—N=N)$_n$K     (VIb)

or of a metal complex derived therefrom, wherein in the formulae VIa and VIb

D is the radical of a diazo component of the benzene or naphthalene series which is unsubstituted or substituted by substituents customary in azo chemistry, in particular by hydroxyl, methyl, ethyl, methoxy or ethoxy groups, by alkanoylamino groups having 2 to 4 C atoms which are substituted or unsubstituted, by benzoylamino groups which are substituted or unsubstituted or by halogen atoms, K is the radical of a coupling component of the benzene, naphthalene, pyrazolone, 6-hydroxypyrid-2-one or acetoacetarylamide series which is unsubstituted or substituted by substituents customary in azo chemistry, in particular by hydroxyl, amino, methyl, ethyl, methoxy or ethoxy groups, by alkanoylamino groups having 2 to 4 C atoms which are substituted or unsubstituted, by benzoylamino groups which are substituted or unsubstituted or by halogen atoms, M is the radical of a middle component of the benzene or naphthalene series which is unsubstituted or substituted by substituents customary in azo chemistry, in particular by hydroxyl, methyl, ethyl, methoxy or ethoxy groups, by alkanoylamino groups having 2 to 4 C atoms which are substituted or unsubstituted, by benzolyamino groups which are substituted or unsubstituted or by halogen atoms and n is 0 to 1 and D, M and K together contain at least two sulfo groups, preferably three or four sulfo groups.

In a further useful group of dyes of the formula III in which p is 2, F is the divalent radical of the formula VIc —D—N=N—(M—N=N)$_n$K—     (VIc)

in which D, K, M and n are as defined above, or is a metal complex derived therefrom.

The dyes of the formula III in which F is a radical of one of the formulae VIa to VIc can be obtained in the case where n=0 in a manner known per se, namely by diazotization of suitable aromatic amine and coupling onto suitable coupling components, of which either the diazo component or the coupling component or both contain a radical of the formula

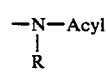

or the coupling component contains [. . . Sic] radical of the formula

and the acyl group is split off after the coupling by hydrolysis.

To prepare disazo dyes of the formula III, that is to say those in which F is a radical of one of the formulae VIa-VIc where n=1, first the diazonium compound of a suitable aromatic amine is coupled on a suitable middle component. The middle component is in principle any benzene or naphthalene derivative which contains a diazotizable amine group. Subsequently, the aminoazo compound which is then present is diazotized and coupled onto a suitable coupling component, either the diazo component of the first coupling or the coupling component of the second coupling or both containing a radical of the formula

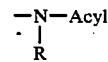

and the acyl group is split off after the coupling by hydrolysis. In place of the

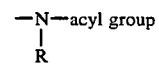 group the coupling component can also contain a

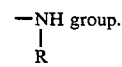 group.

Examples of diazo components which are suitable for preparing dyes of the formula III in which F is a radical of the formula VIa are the aromatic amines listed in the following list No. 1.

List No. 1:

Aniline; o-, m-, p-toluidine;
o-, m-, p-anisidine; o-, m-, p-chloroaniline;
aniline-2-, -3-, -4-carboxylic acid or -sulfonic acid;
aniline-2,4-, -2,5-dicarboxylic acid or -disulfonic acid;
2-aminophenol-4-sulfonic acid;
2-aminophenol-4,6-disulfonic acid;
4-chloro-2-aminophenol-5- or -6-sulfonic acid;
6-chloro-2-aminophenol-4-sulfonic acid;
6-nitro-2-aminophenol-4-sulfonic acid;
4-nitro-2-aminophenol-6-sulfonic acid;
3- or 4-acetylamino-aniline-6-sulfonic acid;
3- or 4-benzoylamino-aniline-6-sulfonic acid;
4-amino-4'-sulfo-benzanilide;
2-aminoanisol-4-sulfonic acid;
4-aminoanisol-2- or -3-sulfonic acid;
3-aminoanisol-4-sulfonic acid;
6-chloro-2-aminobenzenesulfonic acid;
5-nitro-2-aminobenzenesulfonic acid;
4-chloro-3-aminobenzenesulfonic acid;
6-chloro-3-aminobenzenesulfonic acid;
3-chloro-4-aminobenzenesulfonic acid;
2-aminotoluene-4-sulfonic acid;
2-aminotoluene-5-sulfonic acid;
3-aminotoluene-6-sulfonic acid;
4-aminotoluene-2-sulfonic acid;
4-aminotoluene-3-sulfonic acid;
5-chloro-2-aminotoluene-3-sulfonic acid;
3-chloro-2-aminotoluene-5-sulfonic acid;
3-chloro-4-aminotoluene-6-sulfonic acid;
3-nitro-2-aminotoluene-5-sulfonic acid;
3-nitro-4-aminotoluene-2-sulfonic acid;
3-amino-1,2-dimethylbenzene-4-sulfonic acid;
4-amino-1,3-dimethylbenzene-5-sulfonic acid;
4-amino-1,3-dimethylbenzene-6-sulfonic acid;
4-chloro-2-aminoanisol-5-sulfonic acid;
4-aminophenetole-2-sulfonic acid;

4-aminophenetole-3-sulfonic acid;
2-aminophenetole-4-sulfonic acid;
2-aminotoluene-3,4-disulfonic acid;
2-aminotoluene-3,5-disulfonic acid;
4-amino-2-sulfo-2'- or
4'-methoxydiphenylamine;
2-aminodiphenyl ether; 2-, 3- or 4-aminobenzenesulfonamide;
2-naphthalamine-1-, -5-, -6-, -7- or -8-sulfonic acid;
2-naphthylamine-1,5-, -1,7-, -3,6-, -3,7-, -4,7-, -4,8-, -5,7- or -6,8-disulfonic acid;
2-naphthylamine-1,5,7-, -3,6,8- or -4,6,8-trisulfonic acid;
1-naphthylamine-2-, -4-, -5-, -6- or -7-sulfonic acid;
1-naphthylamine-3,6-, -3,7-, -3,8-, -4,6-, -4,7-, -4,8-, -5,7- or -6,8-disulfonic acid;
1-naphthylamine-2,3,6-, -3,6,8- or -4,6,8-trisulfonic acid,
2-amino-1-naphthol-4-sulfonic acid;
2-amino-1-naphthol-7-sulfonic acid;
1-amino-2-naphthol-4-sulfonic acid;
4-nitro-2-amino-1-naphthol-7-sulfonic acid and
5-nitro-1-amino-2-naphthol-4-sulfonic acid.

To construct dyes of the formula III in which F is a radical of the formula VIb or VIc, use is made for example of the diamines listed in List No. 2, in the form of their monoacyl derivatives. The acyl groups can be in particular lower alkanoyl groups having 1 to 5 C atoms, preferably formyl or acetyl. As stated above, the acyl groups are split off after the coupling in order to obtain dyes of the formula III.

List No. 2:
p-Phenylenediamine;
1,4-phenylenediamine-2-sulfonic acid;
1,4-phenylenediamine-2-carboxylic acid;
1,4-diaminonaphthalene-2-sulfonic acid;
2,6-diaminonaphthalene-8-sulfonic acid;
2,6-diaminonaphthalene-4,8-disulfonic acid;
1,6-diaminonaphthalene-4,8-disulfonic acid;
m-phenylenediamine,
1,3-phenylenediamine-4-sulfonic acid;
1,3-phenylenediamine-4,6-disulfonic acid;
1,4-phenylenediamine-2,6-disulfonic acid;
1,4-phenylenediamine-2,5-disulfonic acid;
1,4-diaminonaphthalene-6-sulfonic acid;
4,4'-diaminodiphenyl-3-sulfonic acid;
4,4'-diaminostilbene-2,2'-disulfonic acid.

Examples of middle components which can be involved in constructing the radicals VIa to VIc are listed in the following list No. 3.
List No. 3:
Aniline; m-toluidine;
2,5-dimethylaniline or -dimethoxyaniline;
m-aminoanisole; m-acetylamino,
m-propionylaminoaniline, m-butyrylaminoaniline or m-benzoylaminoaniline;
m-aminophenylurea;
4-acetamino-2-aminotoluene or -anisole;
2-amino-4-methylanisole;
1-aminonaphthalene-6- or -7-sulfonic acid;
2-amino-4-acetylaminobenzenesulfonic acid;
2-amino-5-naphthol-7-sulfonic acid;
2-amino-8-naphthol-6-sulfonic acid;
2-(4-aminobenzoylamino)-5-naphthol-7-sulfonic acid;
1-(4-amino-2-sulfophenyl)-3-methylpyrazol- or -3-carboxypyrazol-5-one;
acetoacet-3-sulfo-4-aminoanilide.

Examples of coupling components which are suitable for preparing dyes of the general formula III in which F is a group of the formula VIb are listed in the following list No. 4.
List No. 4:
2-Naphthol; 2-naphthol-6-, -7- or -8-sulfonic acid;
2-naphthol-3,6-, -3,7-, -4,8- or -6,8-disulfonic acid;
2-naphthol-3,6,8-trisulfonic acid;
1-naphthol-4-, -5-, -6- or -8-sulfonic acid;
1-naphthol-3,6-, -3,7-, -3,8- or -4,8-disulfonic acid;
1-naphthol-3,6-, -3,7-, -3,8- or -4,8-disulfonic acid;
1-naphthol-3,6,8-trisulfonic acid;
2-naphthylamine-5-, -6- or -7-sulfonic acid;
2-naphthylamine-3,6-, -3,7-, -5,7- or -6,8-disulfonic acid;
1-amino-8-naphthol-2,4-disulfonic acid;
2-ureido-5-naphthol-7-sulfonic acid;
1-(4-sulfophenyl)-3-methylpyrazol- or -3-carboxypyrazol-5-one;
1-(4-methyl-2-sulfophenyl)-3-methylpyrazol- or -3-carboxypyrazol-5-one;
1-(2,5-dichloro-4-sulfophenyl)-3-methylpyrazol- or -3-carboxypyrazol-5-one;
4-acetoacetylaminobenzenesulfonic acid;
4-acetoacetylamino-3,6-dimethoxybenzenesulfonic acid;
barbituric acid;
6-hydroxy-4-methyl-3-sulfopyrid- or -3-carboxamidopyrid-2-one.

Examples of coupling components which are suitable for constructing dyes of the formula III in which F is a group of the formula VIa or VIc are listed in the following list No. 5.
List No. 5:
Aniline; m-toluidine; 2,5-dimethylaniline or -dimethoxyaniline;
m-aminoanisole; m-acetylaminoaniline,
m-propionylaminoaniline, m-butyrylaminoaniline or m-benzoylaminoaniline;
m-aminophenylurea;
4-acetamino-2-amino-... [sic] or -anisole;
2-amino-4-methylanisole;
1-aminonaphthalene-6-, -7- or -8-sulfonic acid;
2-amino-4-acetylaminobenzenesulfonic acid;
2-amino-5-naphthol-7-sulfonic acid;
2-amino-8-naphthol-6-sulfonic acid;
2-(4-aminobenzoylamino)-5-naphthol-7-sulfonic acid;
1-(4-amino or 4-acetylamino)-2-sulfophenyl-3-methylpyrazol- or -3-carboxypyrazol-5-one;
acetoacet-3-sulfo-4-aminoanilide;
1-amino-8-naphthol-3,6- or 4,6-disulfonic acid;
1-(3- or 4-aminobenzoyl)-amino-8-naphthol-3,6- or -4,6-disulfonic acid;
1-acetylamino-8-naphthol-3,6- or -4,6-disulfonic acid;
2-acetylamino-5-naphthol-7-sulfonic acid;
2-acetylamino-8-naphthol-6-sulfonic acid;
1-(3-amino- or 3-acetylamino-6-sulfophenyl)-3-methylpyrazol- or -3-carboxypyrazol-5-one;
2-acetylmethylamino- or 2-methylamino-5-naphthol-7-sulfonic acid;
n-methylaniline; N-propyl-m-toluidine.

Disazo dyes which carry one or two

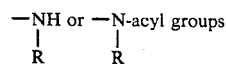

and are suitable for preparing reactive dyes according to the invention can also be obtained for tetrazotization of an aromatic diamine containing two primary amino groups and coupling of the tetrazo compound thus obtained with two mole fractions of a coupling component containing a

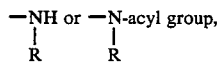

for example of one of the coupling components listed in list 5, or with 1 mole fraction each of two different such coupling components or with 1 mole fraction of such a coupling component and with 1 mole fraction of a coupling component which contains no

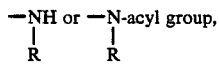

for example of one of those indicated in list 4. Examples of such aromatic diamines are:
List No. 6:
3,3'-Dimethoxybenzidine,
benzidine-2,2'-disulfonic acid,
benzidine-3,3'-dicarboxylic acid,
benzidine-3,3'-diglycolic acid and 4,4'-diaminostilbene-2,2'-disulfonic acid.

Further disazo dyes which contain one or two

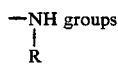 groups and are suitable for preparing reactive dyes according to the invention can be obtained by coupling onto a coupling component which can be coupled twice either 2 mole fractions of a diazotized amine carrying an

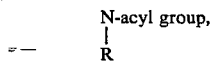

for example of an acyl derivative of one of the amines of list 2, or 1 mole fraction of one of these diazotized amines and 1 mole fraction of a diazotized amine which contains no

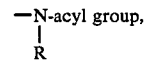

for example of one of the amines of list 1, and subsequently hydrolyzing the dyes obtained. In the case of using 2 mole fractions of the amines carrying an

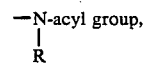

it is possible to use 2 mole fractions of the same amine or 1 mole fraction each of two different amines.
Examples of suitable coupling components which can be coupled twice are
1-amino-8-naphthol-3,6- or
-4,6-disulfonic acid, resorcinol or
5,5'-dihydroxy-7,7'-disulfo-2,2'-dinaphthylurea.

The dyes of the formula III can be obtained in complete analogy to the preparation methods described above if the diazo and coupling components indicated in lists 2, 3 and 5 are replaced by compounds which contain a nitro group in place of the

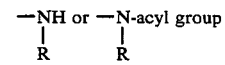

and if the nitro group of the azo compounds constructed from these components is reduced to an amino group. The conditions of this reduction are known per se. A reducing agent which is known for this purpose is alkali metal sulfide, which, at temperatures of 40° to 70° C. in an aqueous medium, reduces the nitro group without attacking the azo group.

Examples of the radicals F of particularly useful monoazo and disazo dyes which are suitable for preparing dyes according to the invention are represented by the following formulae in which the benzene and naphthalene nuclei can be substituted in accordance with the explanations given for D, M and K and the position of the radical of the formula IIIa is indicated by the unoccupied bond:

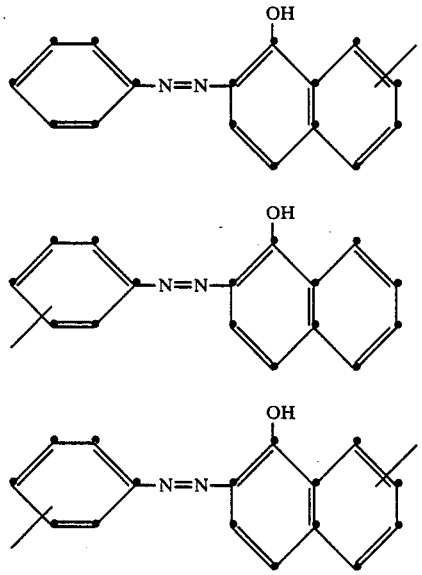

-continued
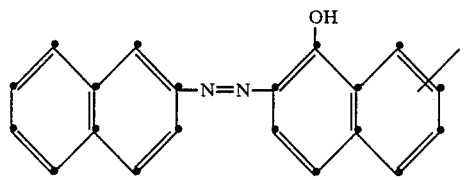
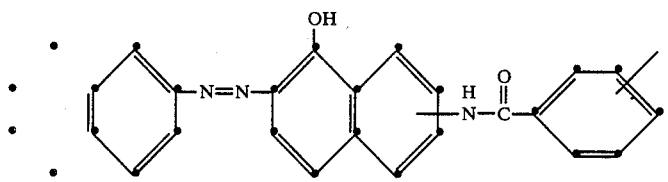
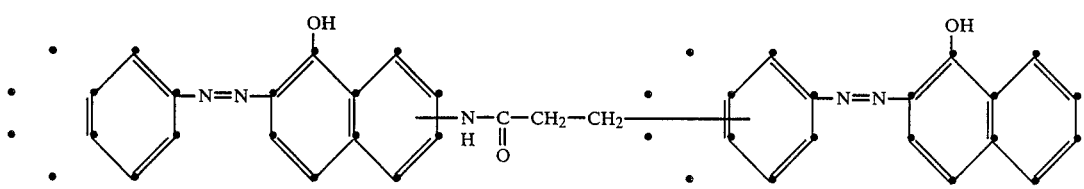
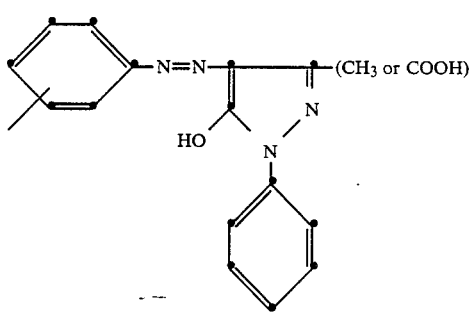
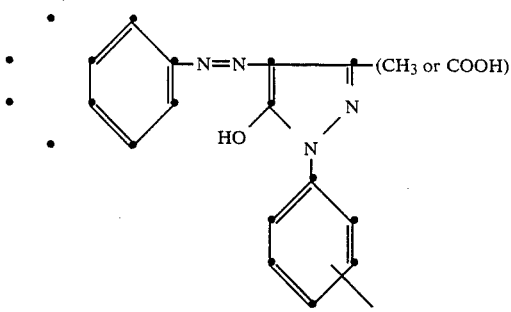
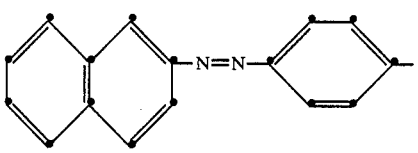
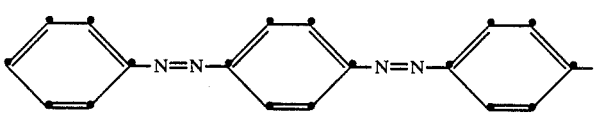

-continued
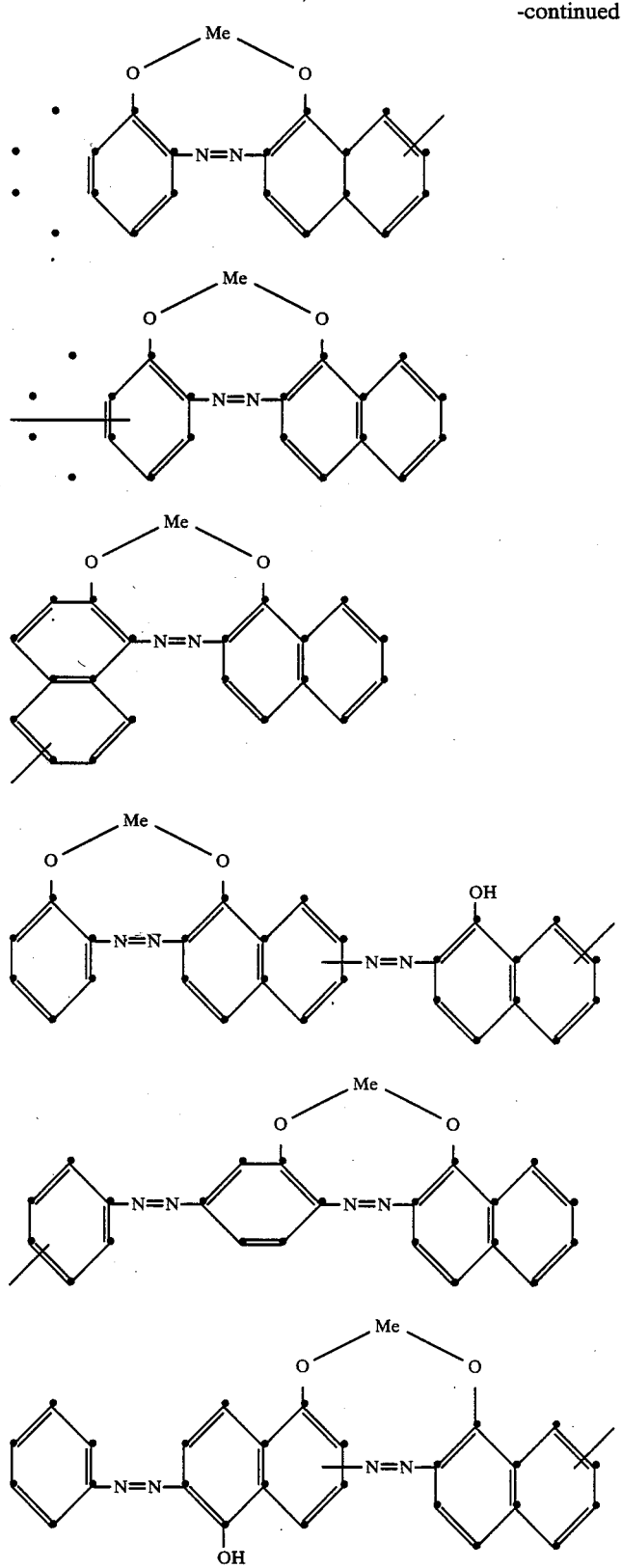
Examples of diazo components from which it is possible to prepare particularly useful monoazo dyes of the formula III are:
aniline-2-sulfonic acid;
aniline-2,5-disulfonic acid;
2-naphthylamine-1-sulfonic acid;
2-naphthylamine-1,5-disulfonic acid;
2-naphthylamine-4,8-disulfonic acid;

2-naphthylamine-3,6,8-trisulfonic acid;
2-naphthylamine-4,6,8-trisulfonic acid.

Examples of coupling components from which it is possible to prepare particularly useful monoazo dyes are:
1-amino-8-naphthol-3,6-disulfonic acid;
1-amino-8-naphthol-4,6-disulfonic acid;
2-amino-5-naphthol-7-sulfonic acid;
1-(4-amino-2-sulfophenyl)-3-carboxypyrazol-5-one;
1-(5-amino-2-sulfophenyl)-3-carboxypyrazol-5-one; aniline; N-methylaniline; 3-aminotoluene;
3-aminoacetanilide; 3-aminophenylurea.

Examples of particularly useful monoazo dyes of the formula III are:

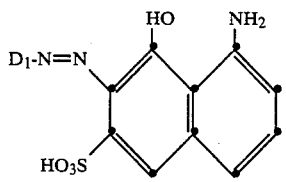

in which $D_1$ is a 2-sulfophenyl, 1-sulfo-2-naphthyl or 1,5-disulfo-2-naphthyl radical and the coupling component is substituted by a further sulfo group in the 3- or 4-position.

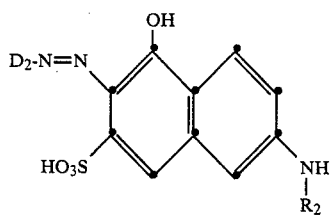

in which $D_2$ is a 1-sulfophenyl, 2,5-disulfophenyl or 1,5-disulfo-2-naphthyl radical, the coupling component carries no further substituents, and $R_2$ is hydrogen or methyl.

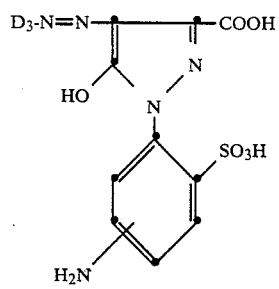

in which $D_3$ is a 2-sulphenyl or 1-sulfo-2-naphthyl radical and the amino group in the 2-sulfophenyl nucleus of the coupling component is in the 4- or 5-position.

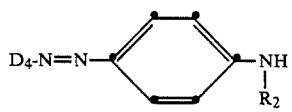

in which $D_4$ is a 2,5-disulfophenyl, 4,8-disulfo-2-naphthyl, 3,6,8-trisulfo-2-naphthyl or 4,6,8-trisulfo-2-naphthyl radical, the coupling component can be substituted in the o-position relative to the azo group by a methyl group, an acetamino group or a urea radical, and $R_2$ is hydrogen or methyl.

Examples of individual dyes of the formula III in which F is a radical of a monoazo or disazo dye are:
1-(3'-aminobenzoylamino)-8-hydroxy-7-(2'-sulfophenylazo)naphthalene-3,6-disulfonic acid,
1-(4-aminobenzoylamino)-8-hydroxy-7,2'-azonaphthalene-1',3,5',6-tetrasulfonic acid,
1amino-8-hydroxy-7,2'-azonaphthalene-1',4,6-trisulfonic acid,
1-(aminoacetylamino)-8-hydroxy-7,2'-azonaphthalene-1',3,5',6-tetrasulfonic acid,
2-methylamino-5-hydroxy-6,2'-azonaphthalene-1',5',7-trisulfonic acid,
2-amino-8-hydroxy-7,2'-azonaphthalene-1',6-disulfonic acid,
2-methylamino-8-hydroxy-7,2'-azonaphthalene-1',6,5'-trisulfonic acid,
2-amino-5-hydroxy-6-(2',5'-disulfophenylazo)-naphthalene-7-sulfonic acid,
2-methylamino-5-hydroxy-6-(4'-methoxy-2'-sulfophenylazo)naphthalene-7-sulfonic acid,
1-amino-8-hydroxy-7-(2'-sulfophenylazo)-naphthalene-3,6-disulfonic acid,
1-amino-8-hydroxy-7-(4'-chloro-2'-sulfophenylazo)-naphthalene-4,6-disulfonic acid,
2-(4'-amino-2'-methylphenylazo)-naphthalene-4,8-disulfonic acid,
2-(4'-amino-2'-methylphenylazo)-naphthalene-4,6,8-trisulfonic acid,
2-(4'-amino-2'-acetylaminophenylazo)-naphthalene-5,7-disulfonic acid,
2-(4'-amino-2'-acetylaminophenylazo)-naphthalene-3,6,8-trisulfonic acid,
4-nitro-4'-(4''-methylaminophenylazo)-stilbene-2,2'-disulfonic acid,
4-nitro-4'-(4''-amino-2''-methyl-5''-methoxyphenylazo)-stilbene-2,2'-disulfonic acid,
1-(2',5'-dichloro-4'-sulfophenyl)-3-methyl-4-(3''-amino-6''-sulfophenylazo)-5-pyrazolone.
1-(4'-sulfophenyl)-3-carboxy-4-(4''-amino-2''-sulfophenylazo)-5-pyrazolone,
1-(2'-methylphenyl)-3-methyl-4-(4''-amino-2'',5''-disulfophenylazo)-5-pyrazolone,
1-(2'-sulfophenyl)-3-methyl-4-(3''-amino-6''-sulfophenylazo)-5-pyrazolone,
2-(3'-sulfophenylamino)-5-hydroxy-6-(4'-amino-2'-sulfophenylazo)-naphthalene-7-sulfonic acid,
1-(3'-aminophenyl)-3-methyl-4-(2'',5''-disulfophenylazo)-5-pyrazolone,
1-(3'-amino-6-sulfophenyl)-3-carboxy-4-(2'-sulfophenylazo)-5-pyrazolone,
1-(4'-amino-2'-sulfophenyl)-3-carboxy-4-(2'-sulfophenylazo)-5-pyrazolone,
1-(4'-amino-2'-sulfophenyl)-3-carboxy-4-[4''-(2''',5'''-disulfophenylazo)-2''-methoxy-5''-methylphenylazo]-5-pyrazolone,
the copper complex of 1-amino-8-hydroxy-7-(2'-hydroxy-5'-sulfophenylazo)-naphthalene-3,6-disulfonic acid,
the copper complex of 2-amino-5-hydroxy-6-(2'-hydroxy-3'-sulfo-5'-nitrophenylazo)-naphthalene-7-sulfonic acid,
the copper complex of 2-amino-5hydroxy-6-(2'-hydroxy-5'-sulfophenylazo)-naphthalene-1,7-disulfonic acid, the copper complex of 1-amino-8-hydroxy-7-(2'-hydroxy-3'-chloro-5'-sulfophenylazo)-naphthalene-3,6-disulfonic acid, the copper complex of 2-methylamino-5-hydroxy-6-(2'-carboxy-5'-sulfophenylazo)-naphthalene-7-sulfonic acid, 4,4'-bis-(1''-amino-8''-hydroxy-3'',6''-disulfo-7''-naphthylazo)-3,3'-dimethoxydiphenyl, 2-amino-5-hydroxy-6-[4'-(2''-sulfophenylazo)-2'-methoxy-5'-methylphenylazo]-naphthalene-1,7-disulfonic acid, 1-amino-8-hydroxy-2-(2',5'-disulfophenylazo)-7-(3'-amino-6'-sulfophenylazo)-naphthalene-3,6-disulfonic acid, the copper complex of 1-amino-8-hydroxy-7-[4'-(2''-sulfophenylazo)-2'-hydroxy-5'-methylphenylazo]-naphthalene-3,6-disulfonic acid, the copper complex of 2-amino-5-hydroxy-6-[4'-(2'',5''-disulfophenylazo)-2'-hydroxy-5'-methylphenylazo]-naphthalene-7-sulfonic acid, the copper complex of 1-(4'-amino-2'-sulfophenyl)-3-carboxy-4-[4''-(2''',5'''-disulfophenylazo)-2''-hydroxy-5''-methylphenylazo]-5-pyrazolone, the copper complex of 2-(4'-amino-3'-sulfoanilino)-5-hydroxy-6-(2''-carboxyphenylazo)-naphthalene-7-sulfonic acid, the 2:1 chromium complex of 2-amino-6'-nitro-8,2'-dihydroxy-7,1'-azonaphthalene-6,4'-disulfonic acid, the 2:1 chromium complex of 2-amino-5-hydroxy-6-(2'-carboxyphenylazo)-naphthalene-7-sulfonic acid, the 2:1 chromium complex of 1-amino-8-hydroxy-7-(4'-nitro-2'-hydroxyphenylazo)-naphthalene-3,6-disulfonic acid, the 2:1 cobalt complex of 2-(4'-amino-3'-sulfoanilino)-5-hydroxy-6-(5''-chloro-2''-hydroxyphenylazo)-naphthalene-7-sulfonic acid, the copper complex of 2-amino-6'-nitro-2',8-dihydroxy-1',7-azonaphthalene-4',6-disulfonic acid, the copper complex of 1,6'-diamino-2',8-dihydroxy-1',7-azonaphthalene-2,4,4'-trisulfonic acid, the copper complex of 6'-amino-1',2-dihydroxy-1,2'-azonaphthalene-3,4',6,8'-tetrasulfonic acid, the copper complex of 1-amino-1',8-dihydroxy-2',7-azonaphthalene-3,4',6,8'-tetrasulfonic acid.

A further way of preparing dyes according to the invention comprises directly preparing monoazo or disazo dyes or if desired their metal complexes of the formula V

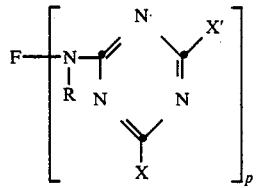
(V)

in which F is a radical of one of the abovementioned formulae VIa to VIc and X and X' are as defined above, by using diazo and coupling components of which one or if desired both contain a group of the formula Va

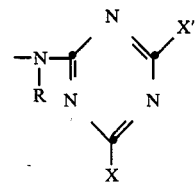
(Va)

and then reacting them as described above with an amine of the formula IIa or II'a.

The starting materials necessary for this purpose are obtained by reacting diazo and coupling components which contain a radical of the formula

with acylating agents of the formula IV.

Diazo components for the direct preparation of azo dyes of the formula V in which F is a radical of the formula VIb or VIc are obtainable for example by acylating the

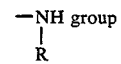

of an aromatic amine listed in list 2 with an acylating agent of the formula IV.

Coupling components for the direct preparation of azo dyes of the formula V in which F is a radical of the formula VIa or VIc are obtainable for example by acylating the

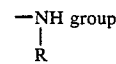

of one of the coupling components mentioned in list 5 with an acylating agent of the formula IV.

Examples of complexing metals which can be contained in the F radicals of metal-containing monoazo or disazo dyes are chromium, manganese, cobalt, nickel and copper. Preference is given to copper, chromium and cobalt.

A further important group of dyes of the general formula III are those in which F is the radical of a derivative of 1-aminoanthraquinone or 1-anilinoanthraquinone, in particular the radical of a 4-phenylamino-1-aminoanthraquinone-2-sulfonic acid derivative. Suitable aminoanthraquinones contain 2 or 3, preferably 2, amino groups, which can also be substituted by alkyl or aryl.

Alkyl radicals have in particular 1 to 4, preferably 1 or 2, C atoms, and the preferred aryl radical is phenyl. The derivatives of aminoanthraquinone can contain 1 to 2 sulfo groups directly in the anthraquinone nucleus and one or two sulfo groups in any aromatic substituents present on the anthraquinone nucleus. The group

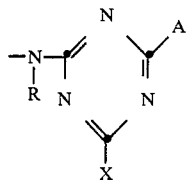

can be bonded directly to the anthraquinone nucleus, but is preferably bonded to a substituent on the anthraquinone nucleus.

In a preferred group of anthraquinone dyes of the formula I according to the invention, F is a radical of the formula VII

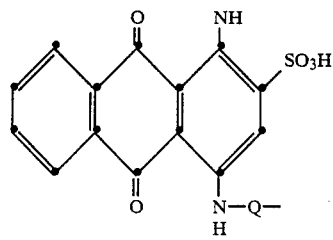

in which the anthraquinone nucleus can be substituted by a futher sulfo group. Q is a phenylene radical which carries a radical of the general formula IIIa. The phenylene radical Q can be substituted by a sulfo or carboxyl group, so that the dye contains at least two strongly water-solubilizing groups. The phenylene radical can be additionally substituted by an alkoxy group having 1–3 C atoms, by a halogen atom or by 1 to 3 alkyl groups having 1–3 C atoms.

The preferred anthraquinone dyes of the general formula III in which F is a radical of the formula VII are prepared by condensing a diamine of the general formula

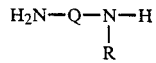

or its monoacyl derivative

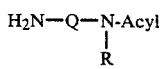

with an anthraquinone derivative which contains in the 4-position a reactive substituent, for example a Br atom. In this formula, acyl has the abovementioned meanings, in particular those characterized as preferred.

Examples of suitable diamines of the formula

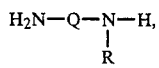

which can also be used in the form of their acyl derivatives are:
2,4-diaminobenzenesulfonic acid,
2,4-diaminotoluene-6-sulfonic acid,
2,6-diaminotoluene-4-sulfonic acid,
3,5-diamino-2,4,6-trimethylbenzenesulfonic acid,
p-phenylenediamine, 2,5-diaminobenzenecarboxylic acid,
2,5-diaminobenzenesulfonic acid,
2,4-diaminobenzenecarboxylic acid.

Examples of dyes of the formula III in which F is the radical of a 1-aminoanthraquinone are:
1-amino-4-(3'-amino-4'-sulfoanilino)-anthraquinone-2-sulfonic acid,
1-amino-4-(3-amino-2',4',6'-trimethyl-4'-sulfoanilino)anthraquinone-2-sulfonic acid,
1-amino-4-(4'-amino-3'-sulfoanilino)-anthraquinone-2,5-disulfonic acid,
1-amino-5,8-bis-(4'-methyl-2'-sulfonanilino)-anthraquinone.

A further important group of dyes of the general formula III are those in which F is the radical of a sulfophthalocyanine dye, in particular of a phthalocyaninesulfanilide or -sulfalkylamide (having 2–6 C atoms in the alkyl chain) derivative which carries at least 2 sulfo groups in the phthalocyanine nucleus.

A preferred group of phthalocyanine dyes of the general formula III are those in which F is a radical of the formula VIII

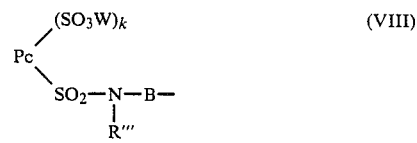

in which Pc is the radical of a metal-containing or metal-free phthalocyanine nucleus, preferably copper- or nickel-phthalocyanine, W is —OH and/or —NR'R", where R', R" and R''' independently of one another are hydrogen or alkyl having 1–4 C atoms, k is the numbers 1 to 3 and B is a phenyl radical which is unsubstituted or substituted by halogen, by 1 to 3 alkyl groups having 1–2 C atoms or by one or two sulfo or carboxyl groups or is an alkyl radical having 2–6 C atoms.

Preferably B is the phenyl radical which is substituted by a sulfo group or is ethylene.

The dyes of the formula III in which F is a radical of the formula VIII are . . . [sic] in a manner known per se by condensing a sulfochloride of the formula

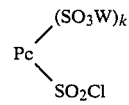

in which Pc, W and k are as defined above, with a diamine of the general formula

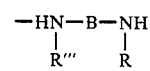

or its monoacyl derivative

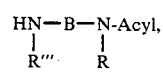

where acyl has the abovementioned meanings, in particular those characterized as preferred.

Examples of diamines of the formula

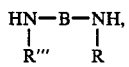

which are suitable for preparing the preferred phthalocyanine dyes of the formula III are:
m-phenylenediamine, p-phenylenediamine,
2,4-diaminobenzenesulfonic acid,
2,5-diaminobenzenesulfonic acid,
2,5-diaminobenzenecarboxylic acid,
2,5-diaminobenzene-1,4-disulfonic acid,
2,4-diaminotoluene-6-sulfonic acid, ethylenediamine, hexamethylenediamine.

Examples of dyes of the formula III in which F is the radical of a N-substituted phthalocyaninesulfonamide are
3-[N-(3-amino-4-sulfophenyl)-sulfamyl]-copper-phthalocyanine-3',3'',3'''-trisulfonic acid,
bis-4,4'-[N-3'-amino-4'-sulfophenyl)-sulfamyl]-copper-phthalocyanine-4'',4'''-disulfonic acid,
3-[N-(4-amino-3-sulfophenyl)-sulfamyl]-nickel-phthalocyanine-3',3'',3'''-trisulfonic acid,
3-[N-(3-aminophenyl)-sulfamyl]-3'-sulfamyl-copper-phthalocyanine-3'',3'''-disulfonic acid,
3-(N-β-aminoethyl-sulfamyl)-copper-phthalocyanine-3',3'',3'''-trisulfonic acid.

The reactive dyes of the formula I according to the invention are highly suitable for dyeing and printing cellulose and cellulose-containing materials. In particular in printing they are distinguished by a uniformly high degree of fixation, irrespective of the kind of fixing method employed, be it for example fixing by steaming or dry-heat or a one- or two-step method. Very good results are also obtained with the various dyeing methods, for example with exhaust dyeing methods or pad-batch methods or pad-thermofixing methods. The resulting dyes and prints are of high brilliance and tinctorial strength combined with very good light fastness properties, even in the wet state, very good wet fastness properties, such as to washing at 60° to 95° C., and good end-use fastness properties, such as fastness to seawater, acid and alkaline perspiration fastness, fastness to chlorinated water, peroxide fastness and fastness to gas fume fading. The dyes are also distinguished by insensitivity to atmospheric factors.

Very good results are also obtained on applying the dyes by reactive dyeing methods to polyamides, in particular wool. In this case the noteworthy properties, apart from very good light fastness, are in particular the outstanding wash and perspiration fastness properties and the excellent buildup.

The temperatures given in the following examples are °Celsius, and the parts and percentages are by weight.

EXAMPLE 1

31.9 parts of 1-amino-8-hydroxynaphthalene-3,6-disulfonic acid are dissolved in 800 ml of water under neutral conditions, and the solution is cooled down to 0° to 5°. At this temperature 14.2 parts of 2,4,6-trifluoro-1,3,5-triazine are added dropwise in the course of 20 minutes, during which the pH of the reaction solution is held weakly acid to Congo red by simultaneous addition of 2N sodium hydroxide solution. After addition of a mixture of 30 parts of N-[2-β-chloroethylsulfonylethyl]-ethylenediamine dihydrochloride in 100 ml of water, which has been adjusted to pH 5, the pH of the reaction mixture, through constant addition of 2N sodium hydroxide solution, is first briefly kept weakly acid to Congo red and then at 5–6. At the same time the temperature is raised to 20° to 25° in the course of 2 to 3 hours. After the reaction has ended this intermediate is coupled at 0° to 10° and pH 5 with 30.3 parts of diazotized 2-aminonaphthalene-1,5-disulfonic acid. After the coupling reaction at pH 7 has ended the reaction mixture is clarified and the resulting reactive dye of the formula

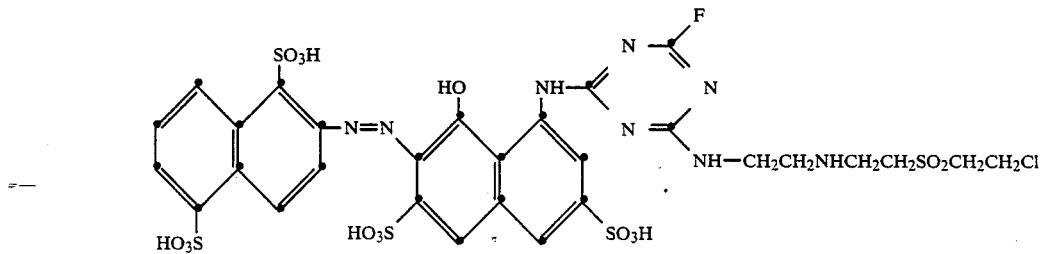

is isolated by evaporating or freeze-drying the reaction solution at pH 7. The dye dyes cotton in red shades.

EXAMPLE 2

31.9 parts of 1-amino-8-hydroxynaphthalene-3,6-disulfonic acid are dissolved in 800 ml of water under neutral conditions, and the solution is cooled down to 0° to 5°. At this temperature 14.2 parts of 2,4,6-trifluoro-1,3,5-triazine are added dropwise in the course of 20 minutes, during which the pH of the reaction solution is held weakly acid to Congo red by simultaneous addition of 2N sodium hydroxide solution. After addition of a mixture of 26 parts of N-(2-β-vinylsulfonylethyl)-ethylenediamine dihydrochloride in 100 ml of water, which has been adjusted to pH 5, the pH of the reaction mixture, through constant addition of 2N sodium hydroxide solution, is first briefly kept weakly acid to Congo red and then at 5–6. At the same time the temperature is raised to 20° to 25° in the course of 2 to 3 hours. After the reaction has ended this intermediate is coupled at 0° to 10° and pH 5 with 30.3 parts of diazotized 2-aminonaphthalene-1,5-disulfonic acid. After the coupling reaction at pH 7 has ended the reaction mixture is clarified and the resulting reactive dye of the formula

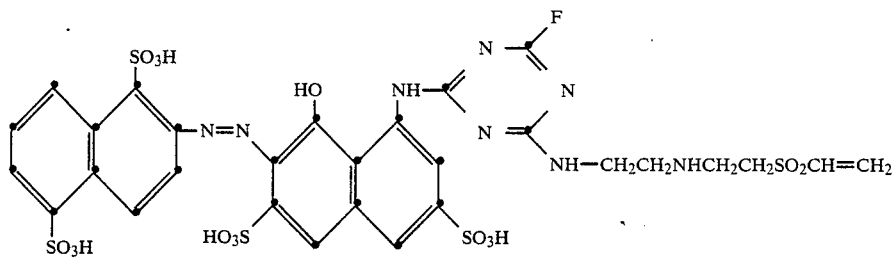

is isolated by evaporating or freeze-drying the reaction solution at pH 7. The dye dyes cotton in red shades.

EXAMPLE 3

31.9 parts of 1-amino-8-hydroxynaphthalene-3,6-disulfonic acid are dissolved in 800 ml of water under neutral conditions, and the solution is cooled down to 0° to 5°. At this temperature 14.2 parts of 2,4,6-trifluoro-1,3,5-triazine are added dropwise in the course of 20 minutes, during which the pH of the reaction solution is held weakly acid to Congo red by simultaneous addition of 2N sodium hydroxide solution. After addition of a mixture of 40 parts of N-(2-chloroethylsulfonyliso-propyl)-ethylenediamine sulfate in 100 ml of water, which has been adjusted to pH 5, the pH of the reaction mixture, through constant addition of 2N sodium hydroxide solution, is first briefly kept weakly acid to Congo red and then at 5–6. At the same time the temperature is raised to 20° to 25° in the course of 2 to 3 hours. After the reaction has ended this intermediate is coupled at 0° to 10° and pH 5 with 30.3 parts of diazotized 2-aminonaphthalene-1,5-disulfonic acid. After the coupling reaction at pH 7 has ended the reaction mixture is clarified and the resulting reactive dye of the formula to 5°. At this temperature 14.2 parts of 2,4,6-trifluoro-1,3,5-triazine are added dropwise in the course of 20 minutes, during which the pH of the reaction solution is held weakly acid to Congo red by simultaneous addition of 2N sodium hydroxide solution. After addition of a mixture of 30 parts of N-(2-β-chloroethylsulfonylethyl)-ethylenediamine dihydrochloride in 100 ml of water, which has been adjusted to pH 5, the pH of the reaction mixture, through constant addition of 2N sodium hydroxide solution, is first briefly kept weakly acid to Congo red and then at 5–6. At the same time the temperature is raised to 20° to 25° in the course of 2 to 3 hours. After the reaction has ended this intermediate is coupled to 0° to 10° and pH 5 with 21.7 parts of diazotized 4-β-sulfatoethylsulfonylaniline. After the coupling reaction at pH 7 has ended the reaction mixture is clarified and the resulting reactive dye of the formula

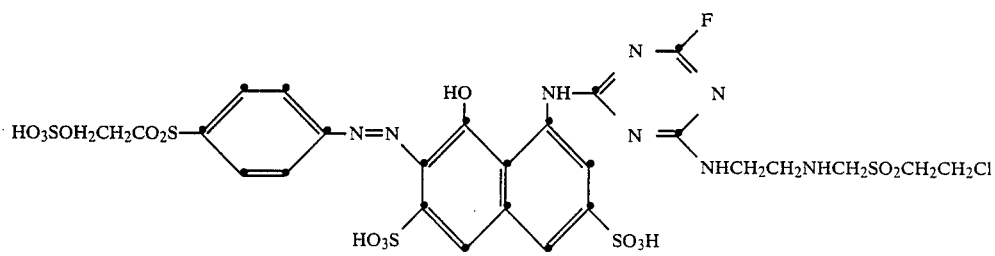

is isolated by evaporating or freeze-drying the reaction solution at pH 7. The dye dyes cotton in red shades.

EXAMPLE 5

18.5 parts of cyanuric chloride are dissolved in 110 parts of acetone, and the solution is added with vigorous stirring to 250 parts of ice. To this is added at 0° a solution of 55.3 parts of the dye of the following structure

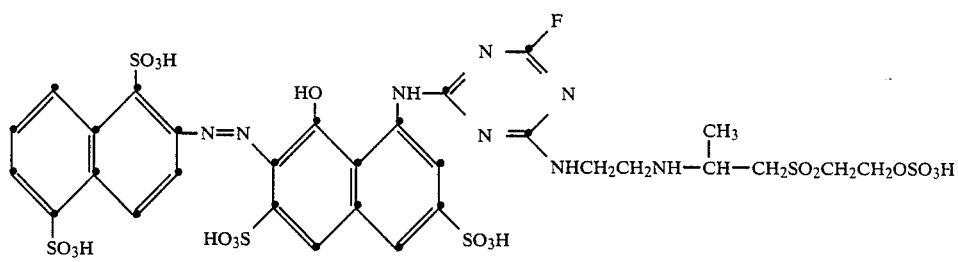

is isolated by evaporating or freeze-drying the reaction solution at pH 7. The dye dyes cotton in red shades.

EXAMPLE 4

31.9 parts of 1-amino-8-hydroxynaphthalene-3,6-disulfonic acid are dissolved in 800 ml of water under neutral conditions, and the solution is cooled down to 0°

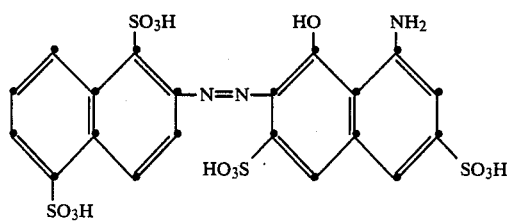

50 parts of 2N sodium carbonate solution are then added dropwise and the pH moves to 6–6.5. 30 parts of N-(2-β-chloroethylsulfonylethyl)-ethylenediamine dihydrochloride are then added in powder form. The temperature is raised to 40° in ½ hour and is then maintained for 3 hours. At the same time 100 parts of 2N sodium carbonate solution are added dropwise at pH 4.0–4.5. to precipitate the dye, 25 g potassium chloride are added, and the solution is cooled down with stirring to 20°–25° and filtered. The result is about 235 parts of dye paste which are dried at 60°–65° in vacuo. The synthesized reactive dye has the following structure:

to 20°–25° and is filtered, and the filter cake is washed with 600 parts of salt water (density 1.142).

EXAMPLE 6

281 parts of 4-β-sulfatoethylsulfonylaniline are introduced to 1,000 parts of water and are brought into solution by careful addition of 65 parts of sodium carbonate, the pH moving to 6.5 to 7.0. Stirring is continued at this pH for 2 hours, and 750 part (sic) of ice and 255 parts of 31% aqueous hydrochloric acid are then added; this is followed by the addition of 173 parts of 40% aqueous sodium nitrite solution, stirring is continued at 0° to 5° for a further 2 hours, and excess nitrous acid is then destroyed by means of sulfamic acid. The diazonium salt suspension thus prepared has added to it, at pH 6.0 to 6.5 and with the simultaneous addition of about 70 parts of sodium carbonate, a solution of the secondary condensation product of one mole each of cyanuric chloride and 1-amino-8-naphthol-3,6-disulfonic acid and N-(2-β-chloroethylsulfonylethyl)-ethylenediamine dihydrochloride. This solution of the secondary condensation product is prepared as follows: 319 parts of

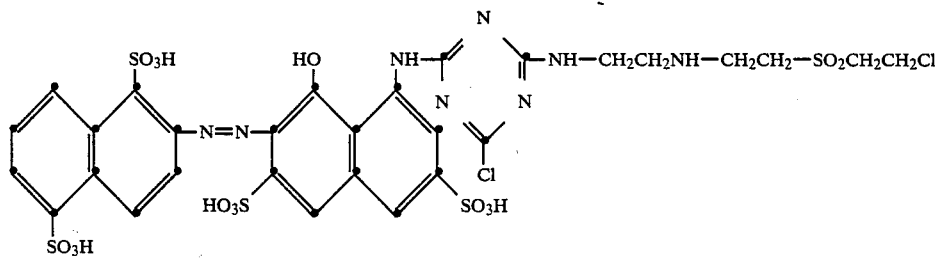

The above starting dye of 1-amino-8-hydroxy-2',7-azonaphthalene-1',3,5',6-tetrasulfonic acid can be obtained as follows:

60.6 parts of 2-naphthylamine-1,5-disulfonic acid are dissolved at pH 7–8 in 300 parts of water and about 20 ml of 10N sodium hydroxide solution by heating to 60°. A solution of 14 parts of sodium nitrite in 60 parts of water is added. This warm mixture at 60° is then added to a mixture of 50 parts of 10N hydrochloric acid and 500 parts of ice, while the temperature should be maintained between 0° and 5° during the diazotization. The mixture is stirred for half an hour and the nitrous acid excess which is present is destroyed by addition of sulfamic acid. The diazo compound comes down in the form of a slightly yellow precipitate. This suspension is added at 0–5° to 72.2 parts of 1-acetamino-8-naphthol-3,6-disulfonic acid which have been dissolved in 500 parts of water under neutral conditions, 200 parts of ice and 17 parts of sodium hydrogencarbonate. The coupling is brought to completion at pH 7. After addition of 60 parts of 10N sodium hydroxide solution the temperature is raised to 70° for 3 hours, thereby hydrolyzing the acetyl group. To precipitate the hydrolyzed dye, the dye solution has added to it 10% of potassium chloride and 15% of sodium chloride, it is brought to neutral pH with 22 parts of 10N hydrochloric acid, is cooled down 1-amino-8-naphthol-3,6-disulfonic acid are introduced with stirring into a mixture of 500 parts of water and 121 parts of 33% sodium hydroxide solution; afterwards the pH of the solution should be 6.5 to 7.0. This solution is added at pH 3.0 to 3.8 to a suspension of 194 parts of cyanuric chloride, 800 parts of water and 800 parts of ice in the course of one hour. Stirring is continued at 0° to 5° and at the indicated pH, which is maintained by sprinkling in 92 parts of sodium bicarbonate, for a further hour. The clear solution thus obtained has added to it 290 parts of N-(2-β-chloroethylsulfonylethyl)-ethylenediamine dihydrochloride, followed in the course of an hour by 115 parts of sodium carbonate, the pH rising to 6.5 to 7.0. At this pH stirring is continued for an additional 2 hours during which the temperature is maintained at 15° to 20°.

After the diazonium suspension and the solution of coupling component have been combined, the coupling mixture is stirred at room temperature for 2 hours during which the pH is maintained at 6.0 to 6.5 by sprinkling in 70 parts of sodium carbonate a little at a time. After the coupling has ended, the temperature is raised to 50°, 40 parts of kieselguhr are added, the solution is clarified (filtered), and the filtrate is if desired treated with 50 parts of disodium phosphate and is spray-dried.

The result is a red electrolyte-containing powder which contains the abovementioned buffer substance, if it was used, and the alkali metal salt, in particular the sodium salt, of the compound of the formula

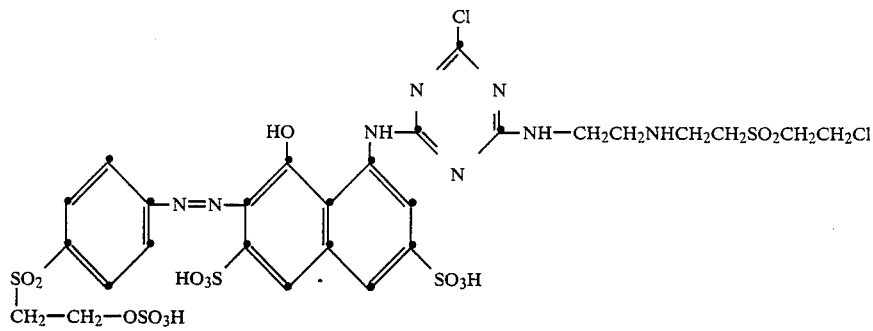

This compound has very good dye properties; applied to the materials mentioned in the description, in particular to wool from an acid bath or to cellulose fiber materials in the presence of acid-binding agents, by the application and fixing methods customary for fiber-reactive dyes in industry, it produces bright red shades with very good color buildup and a high degree of fixation. The dyeings have very good wet fastness properties, such as excellent fastness to washing.

Methods analogous to those described can also be used to prepare the dyes which are listed in the following table, which dye cotton in the indicated shade.

| Examples | Structure | Shade |
|---|---|---|
| 7 | Dye structure with naphthalene-SO₃H groups, N=N azo, HO, NH linked to triazine bearing F and NH—CH₂CH₂CH₂—NH—CH(CH₃)—CH₂SO₂CH=CH₂ | bluish red |
| 8 | Dye structure with naphthalene-SO₃H groups, N=N azo, HO, NH linked to triazine bearing F and NH—CH₂—CH(CH₃)—NH—CH(CH₃)—CH₂SO₂CH=CH₂ | bluish red |
| 9 | Dye structure with naphthalene-SO₃H groups, N=N azo, HO, NH linked to triazine bearing F and NH—CH₂CH₂CH₂—NH—CH(CH₃)—CH₂SO₂CH₂CH₂Cl | bluish red |
| 10 | Dye structure with H₂C=HCO₂S-phenyl-N=N-naphthol(SO₃H)(HO₃S)-NH-triazine(F)-NH—CH₂CH₂—NH—CH₂CH₂SO₂CH₂CH₂Cl | yellowish red |

-continued

| Examples | | Shade |
|---|---|---|
| 11 | H₂C=HCO₂S—[phenyl]—N=N—[naphthalene with HO, HO₃S, SO₃H, NH]—[triazine with Cl, NH—CH₂CH₂—NH—CH(CH₃)—CH₂SO₂CH=CH₂] | yellowish red |
| 12 | H₂C=HCO₂S—[phenyl with SO₃H]—N=N—[naphthalene with HO, HO₃S, SO₃H, NH]—[triazine with F, NHCH₂CH₂—NH—CH(CH₃)—CH₂SO₂CH₂CH₂OSO₃H] | yellowish red |
| 13 | H₂C=HCO₂S—[phenyl with SO₃H]—N=N—[naphthalene with HO, HO₃S, SO₃H, NH]—[triazine with Cl, NHCH₂CH₂—NH—CH₂CH₂SO₂CH₂CH₂Cl] | yellowish red |
| 14 | H₂C=HCO₂S—[phenyl with Br]—N=N—[naphthalene with HO, HO₃S, SO₃H, NH]—[triazine with Cl, NH—CH₂CH₂—NH—CH₂CH₂SO₂CH₂CH₂Cl] | yellowish red |

| Examples | | Shade |
|---|---|---|
| 15 | [structure with ClH₂CH₂CO₂S—(CH₂)₃—C(O)—HN— phenyl-SO₃H, azo-linked naphthalene with OH, HO₃S, SO₃H, NH-triazine(Cl)-NHCH₂CH₂—NH—CH₂CH₂SO₂CH₂CH₂Cl] | yellowish red |
| 16 | [structure with H₂C=HC—O₂S—(CH₂)₃—C(O)—HN— phenyl-SO₃H, azo-linked naphthalene with HO, HO₃S, SO₃H, NH-triazine(Cl)-NHCH₂CH₂—NH—CH—CH₂CH₂SO₂CH₂CH=CH₂] | bluish red |
| 17 | [structure with H₂C=HC—O₂S—(CH₂)₃—C(O)—HN— phenyl-SO₃H, azo-linked naphthalene with HO, HO₃S, SO₃H, NH-triazine(F)-NH—CH₂CH₂—NH—CH₂CH₂SO₂CH₂CH₂Cl] | yellowish red |
| 18 | [structure with ClH₂CH₂CO₂S—(CH₂)₃—C(O)—HN— phenyl-SO₃H, azo-linked naphthalene with HO, HO₃S, SO₃H, NH-triazine(F)-NH—CH₂CH₂—NH—CH₂CH₂SO₂CH₂CH₂Cl] | yellowish red |

-continued
| Examples | | Shade |
|---|---|---|
| 19 | 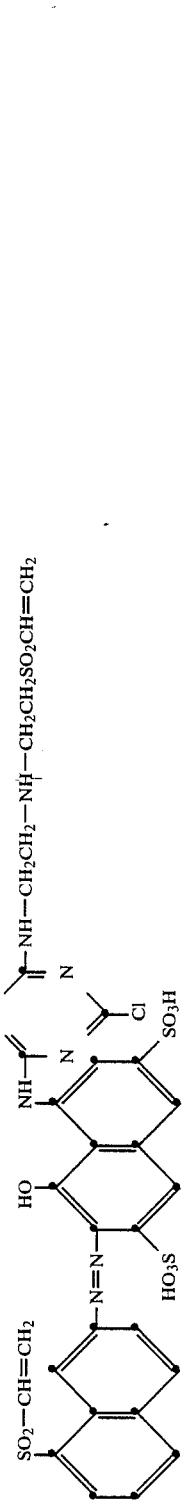 | bluish red |
| 20 | 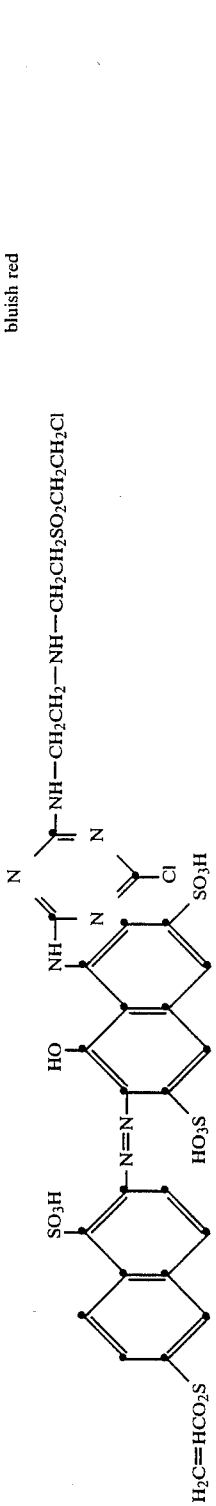 | bluish red |
| 21 | 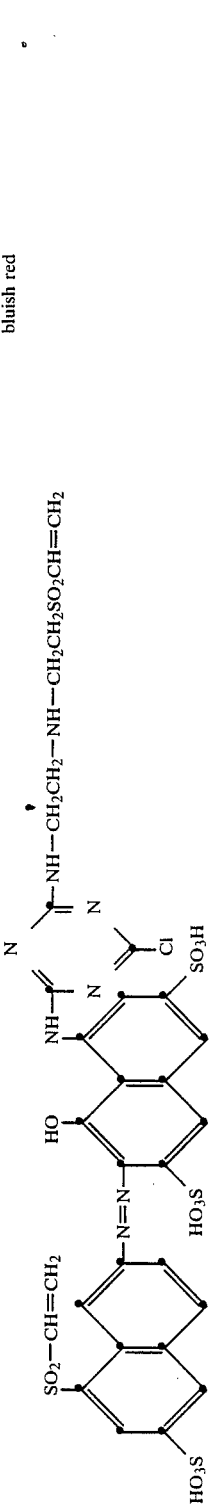 | bluish red |

Example 6 is repeated, except that 2-naphthylamine-1,5-disulfonic acid is replaced by molar amounts of one of the diazo components mentioned hereinafter, likewise affording useful dyes according to the invention:
2-aminobenzenesulfonic acid, 3-aminobenzenesulfonic acid, 4-aminobenzenesulfonic acid, 5-chloro-2-aminobenzenesulfonic acid, 6-chloro-2-aminobenzenesulfonic acid, 5-nitro-2-aminobenzenesulfonic acid, 4-chloro-3-aminobenzenesulfonic acid, 6-chloro-3-aminobenzenesulfonic acid, 3-chloro-4-aminobenzenesulfonic acid, 2-aminotoluene-4-sulfonic acid, 2-aminotoluene-5-sulfonic acid, 3-aminotoluene-6-sulfonic acid, 4-aminotoluene-2-sulfonic acid, 4-aminotoluene-3-sulfonic acid, 5-chloro-2-aminotoluene-3-sulfonic acid, 3-chloro-2-aminotoluene-5-sulfonic acid, 6-chloro-3-aminotoluene-4-sulfonic acid, 2-chloro-4-aminotoluene-5-sulfonic acid, 2-chloro-4-aminotoluene-6-sulfonic acid, 4-nitro-2-aminotoluene-6-sulfonic acid, 6-nitro-4-aminotoluene-2-sulfonic acid, 3-amino-1,2-dimethylbenzene-4-sulfonic acid, 4-amino-1,3-dimethylbenzene-5-sulfonic acid, 4-amino-1,3-dimethylbenzene-6-sulfonic acid, 2-aminoanisole-4-sulfonic acid, 4-aminoanisole-2-sulfonic acid, 4-aminoanisole-3-sulfonic acid, 4-chloro-2-aminoanisole-5-sulfonic acid, 4-aminophenetole-2-sulfonic acid, 4-aminophenetole-3-sulfonic acid, 2-aminophenetole-4-sulfonic acid, 4-aminobenzene-1,3-disulfonic acid, 2-aminobenzene-1,4-disulfonic acid, 2-aminotoluene-3,4-disulfonic acid, 2-aminotoluene-3,5-disulfonic acid, aniline, 4-aminotoluene, 4-aminoanisole, 4-aminochlorobenzene, 2-aminobenzenesulfonic acid, 2-naphthylamine-1-sulfonic acid, 2-naphthylamino-5-sulfonic acid, 2-naphthylamine-6-sulfonic acid, 2-naphthylamine-7-sulfonic acid, 2-naphthylamine-8-sulfonic acid, 2-naphthylamine-1,7-disulfonic acid, 2-naphthylamine-3,6-disulfonic acid, 2-naphthylamine-3,7-disulfonic acid, 2-naphthylamine-4,7-disulfonic acid, 2-naphthylamine-4,8-disulfonic acid, 2-naphthylamine-5,7-disulfonic acid, 2-naphthylamine-6,8-disulfonic acid, 2-naphthylamine-1,5,7-trisulfonic acid, 2-naphthylamine-3,6,8-trisulfonic acid, 2-naphthylamine-4,6,8-trisulfonic acid, 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-3,6-disulfonic acid, 1-naphthylamine-3,7-disulfonic acid, 1-naphthylamine-3,8-disulfonic acid, 1-naphthylamine-4,6-disulfonic acid, 1-naphthylamine-4,7-disulfonic acid, 1-naphthylamine-4,8-disulfonic acid, 1-naphthylamine-5,7-disulfonic acid, 1-naphthylamine-6,8-disulfonic acid, 1-naphthylamine-2,4,6-trisulfonic acid, 1-naphthylamine-3,6,8-trisulfonic acid, 1-naphthylamine-4,6,8-trisulfonic acid.

Example 6 is repeated, except that the coupling component used for preparing the starting dye, namely 1-acetamino-8-naphthol-3,6-disulfonic acid, is replaced by molar amounts of acetyl compound of one of the coupling components mentioned hereinafter, likewise affording useful dyes according to the invention:
1-amino-8-naphthol-4,6-disulfonic acid, 2-amino-8-naphthol-6-sulfonic acid, 2-methylamino-8-naphthol-6-sulfonic acid, 2-carboxymethylaminio-8-naphthol-6-sulfonic acid, 2-β-sulfoethylamino-8-naphthol-6-sulfonic acid, 2-isopropylamino-8-naphthol-6-sulfonic acid, 2-amino-5-naphthol-7-sulfonic acid, 2-methylamino-5-naphthol-7-sulfonic acid, 2-ethylamino-5-naphthol-7-sulfonic acid, 2-n-butylamino-5-naphthol-7-sulfonic acid, 1-amino-8-naphthol-4-sulfonic acid, 2-amino-8-naphthol-4-sulfonic acid, 2-amino-8-naphthol-3,6-disulfonic acid.

EXAMPLE 22

42.3 pats of the dye 2-amino-5-hydroxy-6-(2-sulfophenylazo)-naphthalene-7-sulfonic acid are reacted as described in Example 5 with 18.5 parts of cyanuric chloride and 26 parts of N-(2-β-vinylsulfonylethyl)-ethylenediamine dihydrochloride. To precipitate the dye, the neutral solution is treated with 20% of sodium chloride and 10% of potassium chloride, and is filtered. The paste obtained is dried at 50° to 70° in vacuo. The reactive dye thus prepared has the following structure:

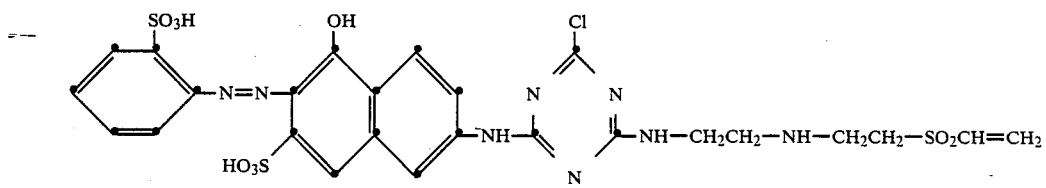

EXAMPLE 23

14.2 parts of 2,4,6-trifluoro-1,3,5-triazine are added dropwise at 0° to 42.3 parts of the dye 2-amino-5-hydroxy-6-(2-sulfophenylazo)-naphthalene-7-sulfonic acid as described in Example 5 in the course of 20 minutes, during which the pH of the reaction solution is maintained at about 6.5 by simultaneous addition of 2N sodium hydroxide solution. After addition of a mixture of 30 parts of N-(2-chloroethylsulfonylethyl)-ethylenediamine dihydrochloride in 100 ml of water, which had been adjusted to pH 5, the pH of the reaction mixture is maintained at 5 to 6 by constant addition of 2N sodium hydroxide solution. At the same time the temperature is raised to 20° in the course of 2 to 3 hours. To precipitate the dye, the neutral solution is treated with 20% of sodium chloride and 10% of potassium chloride and is filtered. The paste obtained is dried at 50° to 70° in vacuo. The reactive dye thus prepared has the following structure:

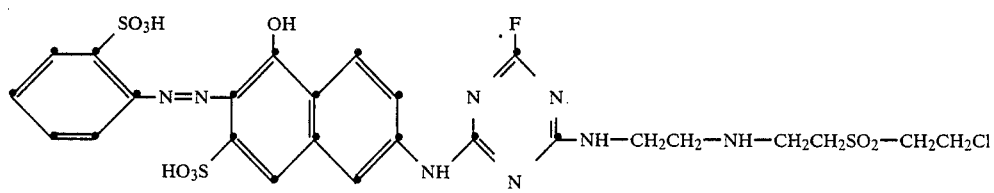
Methods analogous to those described can be used to prepare the dyes listed in the following table, which dye cotton in the indicated shade.

| Examples | | Shade |
|---|---|---|
| 24 | ![structure] naphthol with SO₃H-phenyl-N=N-, OH, HO₃S, NH-triazine(F)-NH-CH₂-CH(CH₃)-NH-CH(CH₃)-CH₂SO₂-CH=CH₂ | orange |
| 25 | ![structure] naphthol with (SO₃H, SO₃H)-phenyl-N=N-, OH, HO₃S, NH-triazine(Cl)-NH-CH₂CH₂-NH-CH₂CH₂SO₂CH₂CH₂Cl | " |
| 26 | ![structure] naphthol with (SO₃H, SO₃H)-phenyl-N=N-, OH, HO₃S, NH-triazine(F)-NH-CH₂CH₂CH₂-NH-CH-CH₂SO₂CH₂CH₂OSO₃H, CH₃ | " |
| 27 | ![structure] naphthol with (SO₃H, SO₃H)-phenyl-N=N-, OH, HO₃S, NH-triazine(F)-NH-CH₂CH₂CH₂-NH-CH(CH₃)-CH₂SO₂-CH=CH₂ | " |
| 28 | ![structure] naphthol with (SO₃H, SO₃H)-phenyl-N=N-, OH, HO₃S, NH-triazine(F)-NH-CH₂CH₂-NH-CH₂CH₂-SO₂CH₂CH₂Cl | " |

-continued

| Examples | | Shade |
|---|---|---|
| 29 | Structure: naphthalene-1,8-disulfonic acid with OH, HO₃S, azo-linked to naphthol-sulfonic acid, NH-triazine(F)-NH(CH₂)₄-NH-CH(CH₃)-CH₂-SO₂-CH=CH₂ | " |
| 30 | Similar to 29 with NH-CH₂CH₂-NH-CH₂CH₂-SO₂-CH=CH₂ | " |
| 31 | H₂C=HC-O₂S-phenyl(SO₃H)-N=N-naphthol(HO₃S,OH)-NH-triazine(Cl)-NH-CH₂CH₂-NH-CH(CH₃)-CH₂SO₂CH₂CH₂Cl | " |
| 32 | H₂C=HC-O₂S-phenyl-N=N-naphthol(HO₃S,OH)-NH-triazine(Cl)-NH-CH₂CH₂-NH-CH₂CH₂SO₂-CH=CH₂ | " |
| 33 | H₂C=HC-O₂S-phenyl(OCH₃)-N=N-naphthol(HO₃S,OH)-NH-triazine(Cl)-NH-CH₂CH₂-NH-CH(CH₃)-CH₂SO₂CH₂CH₂Cl | scarlet |

-continued

| Examples | | Shade |
|---|---|---|
| 34 | H₂C=HC—O₂S—⟨phenyl(OCH₃)⟩—N=N—⟨naphthyl(OH)(HO₃S)⟩—NH—⟨triazine(Cl)⟩—NH—CH₂CH₂—NH—CH₂CH₂—SO₂CH₂CH₂Cl | " |
| 35 | H₂C=HC—O₂S—⟨naphthyl(SO₃H)(HO₃S)⟩—N=N—⟨naphthyl(OH)(HO₃S)⟩—NH—⟨triazine(Cl)⟩—NH—CH₂CH₂—NH—CH₂CH₂—SO₂—CH=CH₂ | " |
| 36 | H₂C=HC—O₂S—⟨naphthyl(SO₃H)(HO₃S)⟩—N=N—⟨naphthyl(OH)(HO₃S)⟩—NH—⟨triazine(F)⟩—NH—CH₂CH₂—NH—CH₂CH₂—SO₂—CH=CH₂ | " |
| 37 | H₂C=HC—O₂S—⟨naphthyl(HO₃S)⟩—N=N—⟨naphthyl(OH)(HO₃S)⟩—NH—⟨triazine(Cl)⟩—NH—CH₂CH₂—NH—CH₂CH₂—SO₂—CH=CH₂ | " |
| 38 | H₂C=HC—O₂S—⟨naphthyl(HO₃S)⟩—N=N—⟨naphthyl(OH)(HO₃S)⟩—NH—⟨triazine(F)⟩—NH—CH₂CH₂—NH—CH₂CH₂—SO₂—CH=CH₂ | " |

The starting dye 2-amino-5-hydroxy-6-(2-sulfophenylazo)-naphthalene-7-sulfonic acid required for preparing the dye according to the invention can be obtained as follows:

34.4 parts of 2-aminobenzenesulfonic acid are dissolved in 120 parts of water under neutral conditions and are diazotized in conventional manner. The diazo compound is then added at 0°–5° to a mixture of 56.2 parts of 2-acetamino-5-naphthol-7-sulfonic acid which have been dissolved in 300 parts of water under neutral conditions, 25 parts of sodium hydrogencarbonate and 150 parts of ice. The pH is initially 6.5, rising on prolonged stirring to 7.5–7.8. After the coupling has ended, 60 parts of 10N sodium hydroxide solution are added, and the temperature is raised to 90° for 2 hours to hydrolyze the acetamino group. The alkaline solution of the orange intermediate dye is neutralized with about 22 parts of 10N hydrochloric acid, is treated with 20% of sodium chloride and 15% of potassium chloride, is stirred for some time and is filtered.

The procedure described above is repeated, except that the 2-aminobenzenesulfonic acid is replaced by molar amounts of one of the diazo components mentioned hereinafter, likewise affording useful dyes according to the invention:
3-aminobenzenesulfonic acid
4-aminobenzenesulfonic acid
5-chloro-2-aminobenzenesulfonic acid
6-chloro-2-aminobenzenesulfonic acid
5-nitro-2-aminobenzenesulfonic acid
4-chloro-3-aminobenzenesulfonic acid
6-chloro-3-aminobenzenesulfonic acid
3-chloro-4-aminobenzenesulfonic acid
2-aminotoluene-4-sulfonic acid
2-aminotoluene-5-sulfonic acid
3-aminotoluene-6-sulfonic acid
4-aminotoluene-2-sulfonic acid
4-aminotoluene-3-sulfonic acid
5-chloro-2-aminotoluene-3-sulfonic acid
3-chloro-2-aminotoluene-5-sulfonic acid
6-chloro-3-aminotoluene-4-sulfonic acid
2-chloro-4-aminotoluene-5-sulfonic acid
2-chloro-4-aminotoluene-6-sulfonic acid
4-nitro-2-aminotoluene-6-sulfonic acid
6-nitro-4-aminotoluene-2-sulfonic acid
3-amino-1,2-dimethylbenzene-4-sulfonic acid
4-amino-1,3-dimethylbenzene-5-sulfonic acid
4-amino-1,3-dimethylbenzene-6-sulfonic acid
2-aminoanisole-4-sulfnic acid
4-aminoanisole-2-sulfonic acid
4-aminoanisole-3-sulfonic acid
4-chloro-2-aminoanisole-5-sulfonic acid
4-aminophenetole-2-sulfonic acid
4-aminophenetole-3-sulfonic acid
2-aminophenetole-4-sulfonic acid
4-aminobenzene-1,3-disulfonic acid
2-aminotoluene-3,4-disulfonic acid
2-aminotoluene-3,5-disulfonic acid aniline
4-aminotoluene
4-aminoanisole
4-aminochlorobenzene
2-aminochlorobenzene
2-naphthylamine-1-sulfonic acid
2-naphthyolamine-5-sulfonic acid
2-naphthylamine-6-sulfonic acid
2-naphthylamine-7-sulfonic acid
2-naphthylamine-8-sulfonic acid
2-naphthylamine-1,7-disulfonic acid
2-naphthylamine-3,6-disulfonic acid.

EXAMPLE 39

76.6 parts of 2-naphthylamine-3,6,8-trisulfonic acid are dissolved in 250 parts of water under neutral conditions. 50 parts of 4N sodium nitrite solution are added. This mixture is added to a mixture of 50 parts of 10N hydrochloric acid and 400 parts of ice. To suspend the diazo compound, a solution of 30.2 parts of 3-aminophenylurea in 100 parts of water and 20 parts of 10N hydrochloric acid is . . . [sic] at 0° to 5°. The mixture is first neutralized to a pH of 3.5 with 140 parts of 4N sodium acetate solution and is then brought to pH 5.5 with sodium hydroxide solution. After the coupling has ended the mixture is filtered.

54.6 parts of the dye 2-(4-amino-2'-ureaphenylazo)-naphthalene-3,6,8-trisulfonic acid thus prepared are dissolved in 250 parts of water under neutral conditions. This neutral solution is added to a suspension of cyanuric chloride in acetone and water prepared as in Example 5. The temperature is maintained at −1° to 3° by cooling with ice. 9 g of bicarbonate are added in the course of the acylation reaction in such a way that the pH stays between 5.5 and 7. As soon as starting dye is no longer detectable in the chromatogram, 30 parts of N-(2-β-chloroethylsulfonylethyl)-ethylenediamine dihydrochloride are added in the form of an approximately 50% paste, and the mixture is heated to 30°. The pH is maintained within the limits of 4.5 and 6.0 by addition of a further 18 g of bicarbonate. The reaction is complete when no further alkali is consumed. The resulting dye of the formula

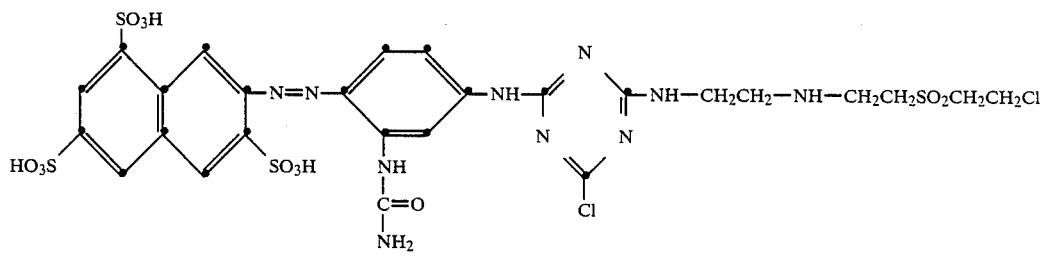

is precipitated by addition of sodium chloride and is dried at 50° to 75° in vacuo.

EXAMPLE 40

54.6 parts of the dye 2-(4-amino-2'-ureaphenylazo)-naphthalene-3,6,8-trisulfonic acid, prepared as in Example 39, are dissolved in 250 parts of water under neutral conditions. 14.2 parts of 2,4,6-trifluoro-1,3,5-triazine are added dropwise to this neutral solution in the course of 20 minutes. The temperature is maintained at −1° to 3° by cooling with ice. 9 g of bicarbonate are added in the course of the acylation reaction in such a way that the pH stays between 5.5 and 7. As soon as starting dye is no longer detectable in the chromatogram, 30 parts of N-(2-chloroethylsulfonylethyl)ethylenediamine dihydrochloride are added in the form of an approximately 50% paste, and the mixture is heated to 20°. The pH is maintained within the limits of 4.5 and 6.0 by addition of a further 18 g of bicarbonate. The reaction is complete when no further alkali is consumed. The resulting dye of the formula

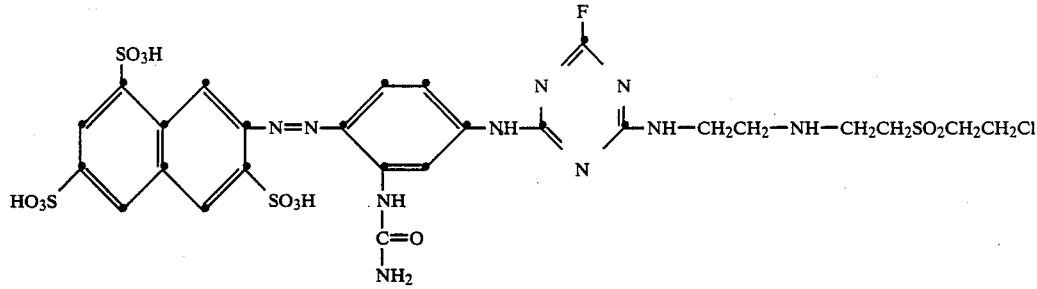

is precipitated by addition of sodium chloride and is dried at 95° in vacuo.

Methods analogous to those described can also be used to prepare the dyes listed in the following table, which dye cotton in the indicated shade.

| Examples | | Shade |
|---|---|---|
| 41 | [structure: naphthalene-(SO3H)3–N=N–phenyl(NHCONH2)–NH–triazine(Cl)–NH–CH2CH2–NH–CH(CH3)–CH2–SO2–CH=CH2] | golden yellow |
| 42 | [structure: naphthalene-(SO3H)3–N=N–phenyl(NHCONH2)–NH–triazine(F)–NH–CH2CH2–NH–CH(CH3)–CH2SO2–CH2CH2OSO3H] | " |
| 43 | [structure: naphthalene-(SO3H)3–N=N–phenyl(NHCONH2)–NH–triazine(F)–NH–CH2CH2CH2–NH–CH(CH3)–CH2SO2–CH=CH2] | " |
| 44 | [structure: naphthalene-(SO3H)3–N=N–phenyl(NHCONH2)–NH–triazine(F)–NH–CH2–CH(CH3)–NH–CH(CH3)–CH2SO2CH2CH2–OSO3H] | " |

| Examples -continued | Shade |
|---|---|
| 45 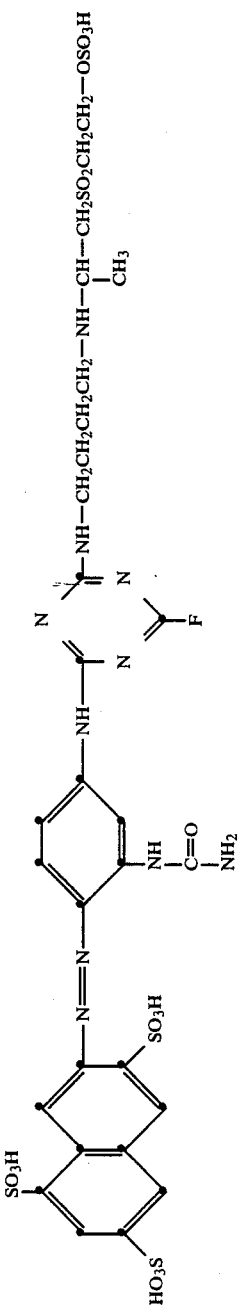 | " |

Similarly useful reactive dyes are also obtained on replacing the starting dye used above, namely 2-(4'-amino-2'-methylphenylazo)-naphthalene-4,6,8-trisulfonic acid, by the azo dyes obtainable from the diazo and coupling components indicated in the following table and otherwise using the procedure described above:

11 g of sodium carbonate a little at a time. The reaction is complete after about 3 hours, completion being indicated by the fact that no further alkali is consumed. The dyeing solution is now brought to 7.0 by addition of disodium hydrogenphosphate. The resulting dye of the structure

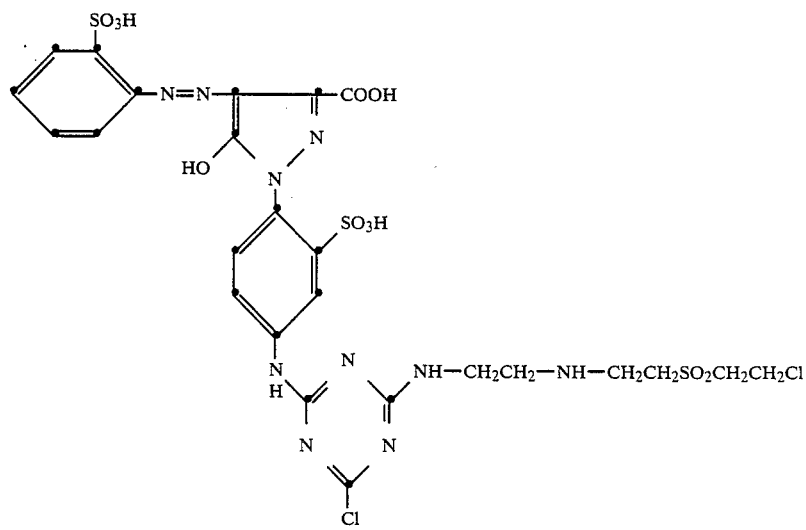

Diazo components:
  2-naphthylamine-1,5-disulfonic acid
  2-naphthylamine-4,8-disulfonic acid
  2-naphthylamine-5,7-disulfonic acid
  2-naphthylamine-6,8-disulfonic acid
  2-naphthylamine-1,5,7-trisulfonic acid
  2-naphthylamine-4,6,8-trisulfonic acid
  aniline-2,5-disulfonic acid.
Coupling components:
  aniline, N-methylaniline,
  3-aminoanisole, 3-aminotoluene,
  2-amino-4-acetaminotoluene,
  2-amino-4-acetaminoanisole,
  3-aminoacetanilide,
  3-amino-4-methoxytoluene,
  1-naphthylamine-5-sulfonic acid,
  1-naphthylamine-7-sulfonic acid,
  1-naphthylamine-8-sulfonic acid.

EXAMPLE 46

63.1 parts of 1-[2'-sulfo-4'-(3",5"-dichlorotriazinyl amino)-phenyl]-3-carboxy-4-(2-sulfophenylazo)-pyrazol-5-one are dissolved at pH 6.8 to 7.2 in water. 30 parts of N-(2-β-chloroethylsulfonylethyl)-ethylenediamine dihydrochloride are added at about 20°, and the mixture is heated to 35° to 40°. The pH begins to drop. When it has reached a value of about 3.5, it is maintained within the range from 3.5 to 4.5 by adding about can be isolated by salting out or spray-drying. Preparation of the starting dye 49.7 parts of the yellow azo dye obtained in accordance with Example 2 of German Auslegeschrift 1,922,940 from diazotized 1-aminobenzene-2-sulfonic acid and 1-(4-amino-2-sulfophenyl)-5-pyrazolone-3-carboxylic acid are dissolved under neutral conditions and are reacted at 0°-5° and pH 6.5 with a suspension of 18.5 parts of cyanuric chloride, prepared in water/acetone according to Example 5. To maintain the pH range, about 6 parts of sodium carbonate are added. The reaction is complete when the dye is no longer diazotizable.

EXAMPLE 47

59.8 parts of 1-[2'-sulfo-4'-(3",5"-difluorotriazinylamino)-phenyl]-3-carboxy-4-(2-sulfophenylazo)-pyrazol-5-one are dissolved at pH 6.8 to 7.2 in water. 30 parts of N-(2-β-chloroethylsulfonylethyl)-ethylenediamine dihydrochloride are added to this solution at approximately 0° and heated to 0° to 20°. The pH begins to drop. When it has reached a value of about 3.5, it is maintained within the range from 3.5 to 4.5 by adding about 11 g of sodium carbonate a little at a time. The reaction is complete after about 3 hours, completion being indicated by the fact that no further alkali is consumed. The dyeing solution is now brought to 7.0 by addition of disodium hydrogenphosphate. The resulting dye of the structure

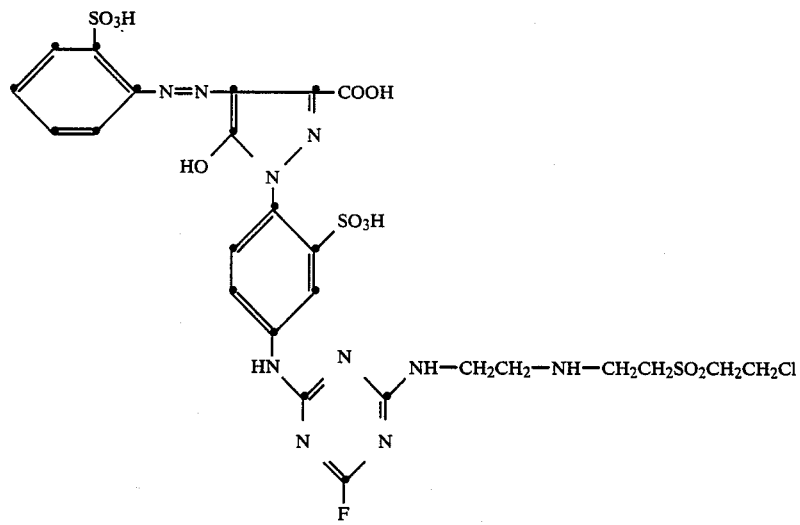
can be isolated by salting out or spray-drying.
Methods analogous to those described can also be used to prepare the dyes listed in th following table, which dye cotton in the indicated shade.

| Examples | | Shade |
|---|---|---|
| 48 | structure with NH—CH₂CH₂CH₂CH₂—SO₂—CH(CH₃)—CH₂SO₂CH₂CH₂OSO₃H | greenish yellow |
| 49 | structure with NH—CH₂CH₂—CH(CH₃)—CH₂—SO₂—CH₂CH₂—OSO₃H | " |

-continued
| Examples | | Shade |
|---|---|---|
| 50 | 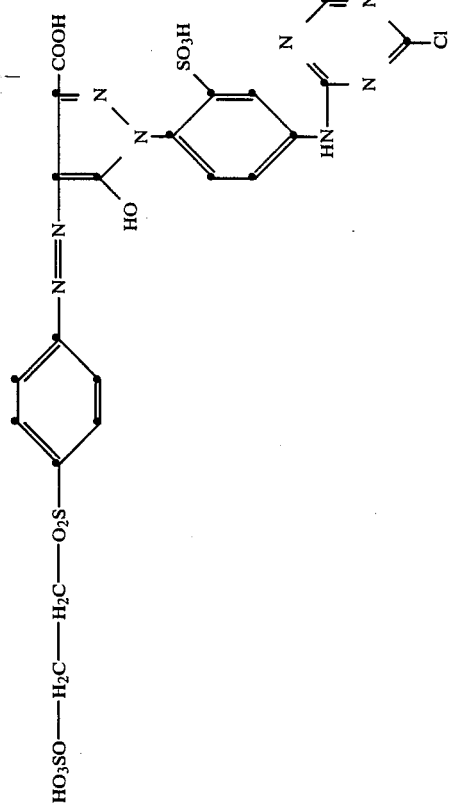 | " |
| 51 | 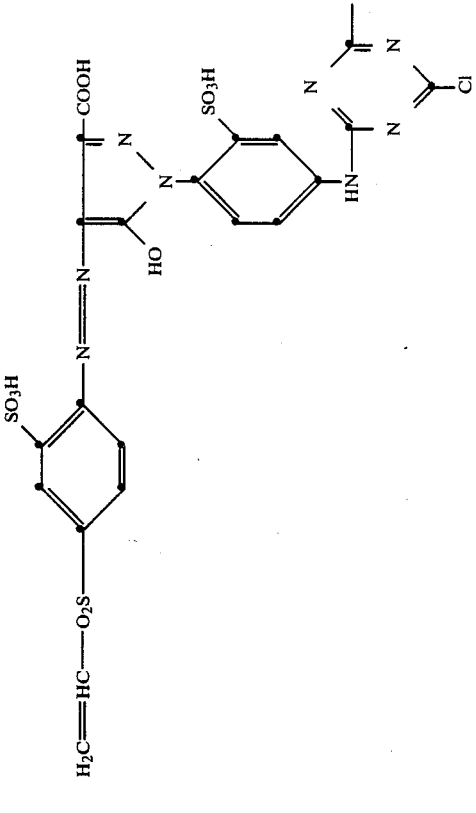 | " |

-continued
| Examples | | Shade |
|---|---|---|
| 52 | 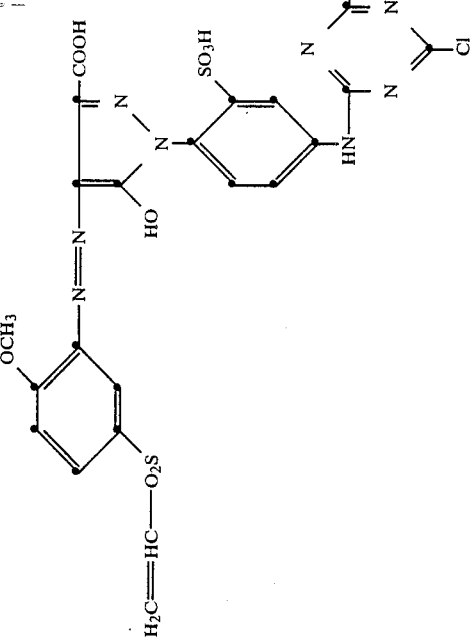 | golden yellow |
| 53 | 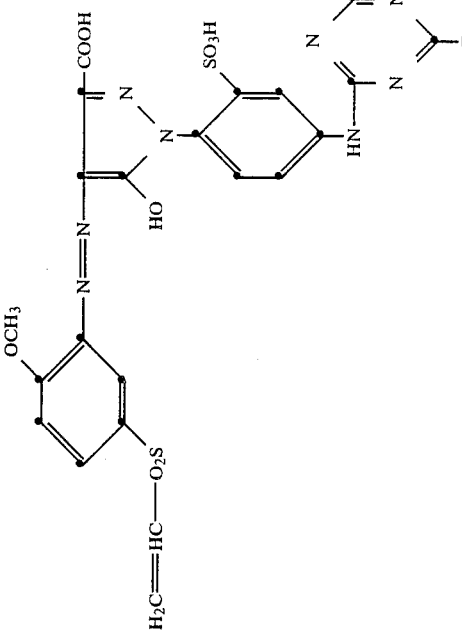 | ″ |

-continued

| Examples | Shade |
|---|---|
| 54 [structure with H2C=HC—O2S—phenyl(OCH3)—N=N—C(OH)=C(COOH)—NH—phenyl(SO3H)—NH—triazine(F)—NH—CH2CH2—NH—CH(CH3)—CH2—SO2—CH2CH2—OSO3H] | " |
| 55 [structure with H2C=HC—O2S—phenyl—N=N—C(OH)=C(COOH)—NH—phenyl(SO3H)—NH—triazine(F)—NH—CH2CH2—NH—CH2CH2—SO2CH=CH2] | " |

-continued
| Examples | | Shade |
|---|---|---|
| 56 | 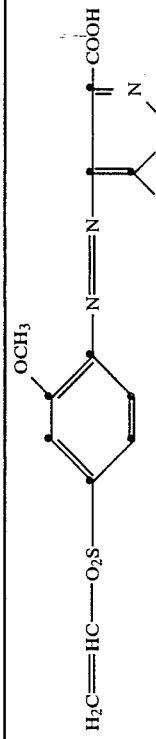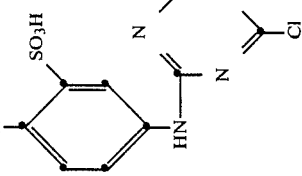 | " |
| 57 | 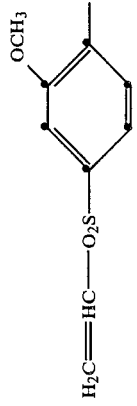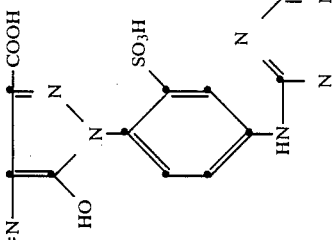 | " |

Similar useful reactive dyes according to the invention are obtained on replacing the above-used intermediate dye by the condensation products of the azo dyes obtainable from the diazo and coupling components indicated in the table below, together with cyanuric chloride and otherwise following the procedure described above.

Diazo components:
  3-aminobenzenesulfonic acid
  4-aminobenzenesulfonic acid
  5-chloro-2-aminobenzenesulfonic acid
  2,5-dichloro-4-aminobenzenesulfonic acid
  2-aminotoluene-4-sulfonic acid
  4-aminotoluene-3-sulfonic acid
  2-aminoanisole-4-sulfonic acid
  4-aminobenzene-1,3-disulfonic acid
  2-aminobenzene-1,4-disulfonic acid
  2-aminotoluene-3,5-disulfonic acid
  2-aminonaphthalene-1,5-disulfonic acid
  2-aminonaphthalene-4,8-disulfonic acid
  2-aminonaphthalene-6,8-disulfonic acid
  2-aminonaphthalene-1-sulfonic acid
  2-aminonaphthalene-6-sulfonic acid Coupling components:
  1-(3'-amino-6'-sulfophenyl)-3-methyl-5-pyrazolone
  1-(4'-amino-3'-sulfophenyl)-3-methyl-5-pyrazolone
  1-(4'-amino-2'-sulfophenyl)-3-methyl-5-pyrazolone
  1-(3'-amino-6'-sulfophenyl)-5-pyrazolone-3-carboxylic acid
  1-(4'-amino-3'-sulfophenyl)-5-pyrazolone-3-carboxylic acid
  1-(3'-amino-5'-sulfo-6-methylphenyl)-5-pyrazolone-3-carboxylic acid
  1-(2'-methyl-3'-amino-5-sulfophenyl)-5-pyrazolone-3-carboxylic acid
  1-(2'-methyl-3'-amino-5-sulfophenyl)-3-methyl-5-pyrazolone
  1-(3'-amino-5'-sulfo-6-methylphenyl)-3-methyl-5-pyrazolone
  1-(4'- amino-2',5'-disulfophenyl)-5-pyrazolone-3-carboxylic acid.

EXAMPLE 58

50.3 parts of the monoazo dye 1-(5'-amino-2'-sulfophenylazo)-2-naphthol-6,8-disulfonic acid are reacted first at 0° to 5° and at a pH of 6 to 6.5 with a suspension of 18.5 parts of cyanuric chloride, which has been prepared by dissolving the cyanuric chloride in 100 parts of acetone and precipitating with 250 g of ice, and then at 30° to 40° and at a pH of 4.0 to 4.5 with 30 parts of N-(2-β-chloroethylsulfonylethyl)-ethylenediamine dihydrochloride. The resulting orange reactive dye of the formula is isolated from the neutral solution by evaporating to dryness at 55°–60° in vacuo or by precipitating with sodium chloride, filtering and drying in vacuo.

The starting dye 1-(5'-amino-2'-sulfophenylazo)-2-naphthol-6,8-disulfonic acid is obtained by coupling diazotized 2-amino-4-acetaminobenzenesulfonic acid with 2-naphthol-6,8-disulfonic acid and subsequently hydrolyzing the acetyl group with sodium hydroxide solution or hydrochloric acid.

Similar useful reactive dyes according to the invention are obtained on starting from amino-containing monoazo dyes which can be prepared from the diazo and coupling components mentioned hereinafter by subsequent hydrolysis of the acetyl group or reduction of the nitro group and otherwise following the above procedure.

Diazo components:
  2-amino-5-acetaminobenzenesulfonic acid
  2-amino-4-acetaminotoluene-5-sulfonic acid
  2-amino-4-acetaminotoluene-6-sulfonic acid
  2-amino-6-acetaminotoluene-4-sulfonic acid
  5-nitro-2-aminobenzenesulfonic acid
  6-acetamino-2-aminonaphthalene-4,8-disulfonic acid
  4-nitro-2-aminotoluene-6-sulfonic acid
  6-nitro-4-aminotoluene-2-sulfonic acid
  6-nitro-2-aminonaphthalene-8-sulfonic acid
  6-nitro-2-aminonaphthalene-4,8-disulfonic acid.

Coupling components:
  1-naphthol-3,6-disulfonic acid
  1-naphthol-3,8-disulfonic acid
  1-naphthol-3,7-disulfonic acid
  2-naphthol-3,7-disulfonic acid
  2-naphthol-4,8-disulfonic acid
  1-naphthol-3,6,8-trisulfonic acid
  2-naphthol-3,6,8-trisulfonic acid
  2-aminonaphthalene-3,6-disulfonic acid
  2-aminonaphthalene-5,7-disulfonic acid
  1-(2'- or 3'- or 4'-sulfophenyl)-3-methyl-5-pyrazolone
  1-(2'-methyl-4'-sulfophenyl)-3-methyl-5-pyrazolone
  1-(2',5'-dichloro-4'-sulfophenyl)-3-methyl-5-pyrazolone
  1-(2',5'-disulfophenyl)-3-methyl-5-pyrazolone
  1-(2'- or 3'- or 4'-sulfophenyl)-5-pyrazolone-3-carboxylic acid
  1-(2'-chloro-5'-sulfophenyl)-5-pyrazolone-3-carboxylic acid.

EXAMPLE 59

50.3 parts of the dye 1-amino-4-(3'-amino-4'-methyl-5'-sulfophenylamino)-anthraquinone-2-sulfonic acid are brought into neutral solution in water with the neces-

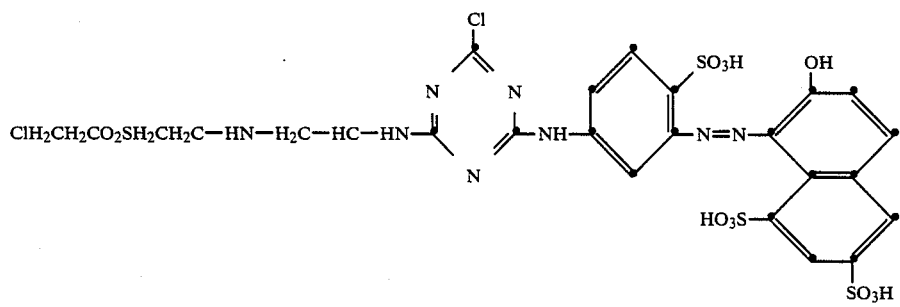

sary amount of sodium carbonate. This solution is added at 0°–5° to a suspension of 18.5 parts of cyanuric chloride, which has been prepared by the dropwise addition of a solution of the cyanuric chloride in 110 parts of acetone to 250 parts of ice. The hydrogen chloride formed in the course of the reaction is neutralized by the dropwise addition of 50 parts of 2N sodium carbonate solution, the pH moving to 6–6.5. 30 parts of N-(2-β-chloroethylsulfonylethyl)-ethylenediamine dihydrochloride are then added, and the temperature is raised to 30°–40° and is maintained at that level for 3 hours. At the same time the pH is maintained at 4.0–4.5 by dropwise addition of 100 parts of 2N sodium carbonate solution. The resulting reactive dye of the formula brought into a neutral solution in water with the necessary amount of sodium carbonate. To this solution are added dropwise at 0° in the course of 20 minutes 14.2 parts of 2,4,6-trifluoro-1,3,5-triazine. The hydrogen fluoride formed in the course of the reaction is neutralized by the dropwise addition of 50 parts of 2N sodium carbonate solution, the pH moving to 6 to 6.5 30 parts of N-(2-β-chloroethylsulfonylethyl)-ethylenediamine dihydrochloride are then added, and the temperature is raised to 5° and is maintained at that level for 3 hours. At the same time the pH is maintained at 4.0 to 4.5 by the dropwise addition of 100 parts of 2N sodium carbonate solution. The resulting reactive dye of the formula

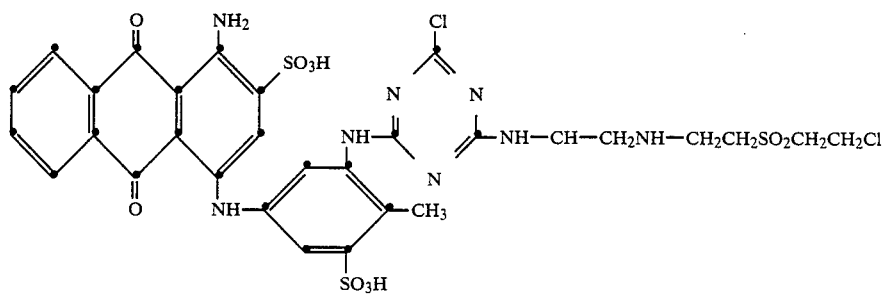

is salted out with sodium chloride, is filtered off and is dried at 55°–60°.

EXAMPLE 60

50.3 parts of the dye 1-amino-4-(3'-amino-4'-methyl-5'-sulfophenylamino)-anthraquinone-2-sulfonic acid are

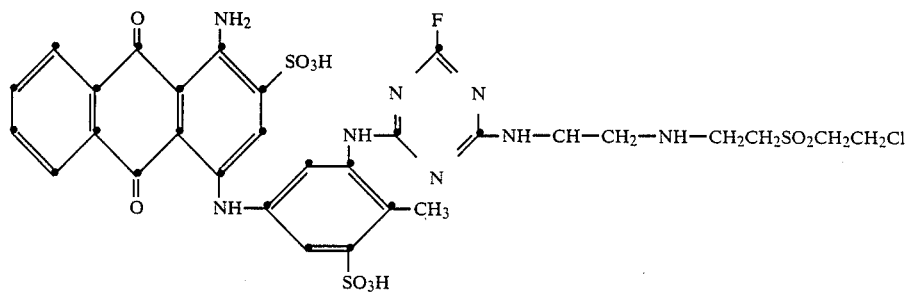

is salted out with sodium chloride, is filtered and is dried at 40°.

Methods analogous to those described can also be used to prepare the dyes listed in the following table, which dye cotton in the indicated shade.

| | Examples | Shade |
|---|---|---|
| 61 | | blue |

| Examples | Shade |
|---|---|
| 62 (anthraquinone dye structure with F-triazine linked to —NH—CH₂CH₂CH₂—NH—CH(CH₃)—CH₂—SO₂—CH=CH₂) | blue |
| 63 (anthraquinone dye structure with Cl-triazine linked to —NH—(CH₂)₄—NH—CH—CH₂SO₂CH₂CH₂OSO₃H) | blue |

Similarly useful dyes according to the invention are obtained on replacing the starting dye 1-amino-4-(3'-amino-4'methyl-5'-sulfophenylamino)-anthraquinone-2-sulfonic acid by dyes of the following table and otherwise following the above procedure.

Intermediate dyes:
  1-amino-4-(3'-amino-4'-sulfophenylamino)-
    anthraquinone-2-sulfonic acid
  1-amino-4-(4'-amino-3'-sulfophenylamino)-
    anthraquinone-2-sulfonic acid nuric chloride in 110 parts of acetone to 250 parts of ice. During the reaction the pH is maintained at 6 to 6.5 by the dropwise addition of 50 ml of 2N sodium carbonate solution. The resulting intermediate stage has added to it 30 parts of N-(2-β-chloroethylsulfonylethyl)- ethylenediamine dihydrochloride, and the mixture is raised to 35° to 45° for 4 hours. At the same time the pH is maintained at 4.0 to 4.5 by the dropwise addition of 100 parts of 2N sodium hydroxide solution. The synthesized reaction dye has the following structure:

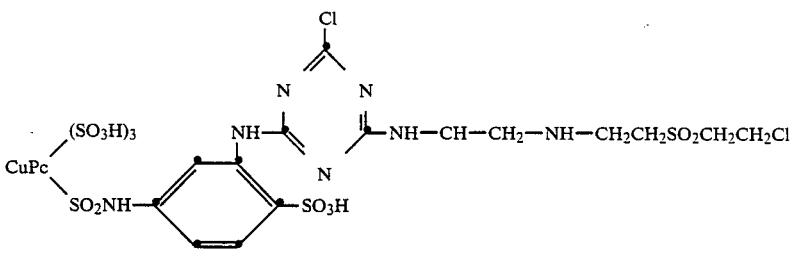

1-amino-4-(3'-amino-2'-methyl-5'-sulfo-
  phenylamino)-anthraquinone-2-sulfonic acid
1-amino-4-(4'-amino-2',2''-disulfodiphen-4''-
  ylamino)-anthraquinone-2-sulfonic acid
1-amino-4-(3'amino-4'-methyl-5'-sulfophenylsulfo-
  nylphen-3''-ylamino)-anthraquinone-2-sulfonic
  acid
1-amino-4-(4'-aminophenylamino)-anthraquinone-
  2,5-disulfonic acid
1-amino-4-(4''amino-2',2''-disulfostilb-4'-ylamino)-
  anthraquinone-2-sulfonic acid.

EXAMPLE 64

106.6 parts of the dye 3-(3'-amino-4'-sulfophenylaminosulfonyl)-copper-phthalocyanine-3'',3''',3''''-trisulfonic acid are brought into neutral solution in water with the necessary amount of sodium carbonate. This solution is added at 0° to 5° to a suspension of 18.5 parts of cyanuric chloride, which has been prepared by dropwise addition of a solution of the cya- It is precipitated with sodium chloride, is filtered off and is dried at 55°–60° in vacuo.

EXAMPLE 65

106.6 parts of the dye 3-(3'-amino-4'-sulfophenylaminosulfonyl)-copper-phthalocyanine-3'',3''',3''''-trisulfonic acid are brought into neutral solution in water with the necessary amount of sodium carbonate. To this solution is added dropwise at 0° in the course of 20 minutes 14.2 parts of 2,4,6-trifluoro-1,3,5-triazine. During the reaction the pH is maintained at 6 to 6.5 by the dropwise addition of 50 ml of 2N sodium carbonate solution. The intermediate stage obtained has added to it 30 parts of N-(2-β-chloroethylsulfonylethyl)-ethylenediamine dihydrochloride, and the mixture is raised to 0° to 10° for 2 hours. At the same time the pH is maintained at 4.0 to 4.5 by the dropwise addition of 100 parts of 2N sodium hydroxide solution.

The synthesized reactive dye has the following structure:

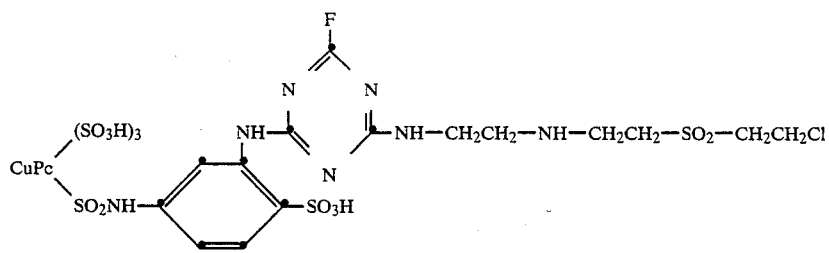

It is precipitated with sodium chloride, is filtered off and is dried at 40° in vacuo.

The starting dye 3''-(3'-amino-4'-sulfophenylaminosulfonyl)-copper-phthalocyanine-3''',3'''',3'''''-trisulfonic acid can be prepared by reaction at pH 5-9 of copper-phthalocyanine tetrasulfochloride with 2,4-diaminobenzenesulfonic acid in the presence of pyridine.

Similar useful dyes according to the invention are obtained on using starting dyes prepared in place of 2,4-diaminobenzenesulfonic acid with 2,4-diaminotoluene-6-sulfonic acid
2,5-diaminobenzenesulfonic acid
2,6-diaminotoluene-4-sulfonic acid
4,4'-diaminodiphenyl-2,2'-disulfonic acid
3,3'-diamino-4-methyl-5-sulfodiphenyl sulfone and otherwise carrying out the reaction with cyanuric chloride and α-carboxy-β-chloroethylsulfonylethylamine hydrochloride as described above.

Similarly useful reactive dyes according to the invention are also obtained on using in place of copperphthalocyanine dyes corresponding nickel-phthalocyanine dyes.

EXAMPLE 66

58.1 parts of the copper complex dye prepared by diazotization of 2-aminophenol-4,6-disulfonic acid and coupling onto 2-amino-5-naphthol-7-sulfonic acid with subsequent coppering in acetic acid solution are dissolved in water under neutral conditions. This dye solution is added at 0°-5° to a suspension of 18.5 parts of cyanuric chloride, which has been obtained by dissolving the cyanuric chloride in 110 parts of acetone and dropwise addition of this solution to 250 parts of ice. During the reaction the pH is maintained at 4.5-5.5 by the dropwise addition of 50 parts of 2N sodium carbonate solution. The mixture is stirred at 0°-5° for 1-2 hours until the reaction has ended. 30 parts of N-(2-β-chloroethylsulfonylethyl)-ethylenediamine dihydrochloride are then added, the mixture is heated to about 45° and the pH is maintained at 4.5-5.0 by the addition of 100 parts of 2N sodium carbonate solution a little at a time. The resulting ruby red reactive dye has the following formula:

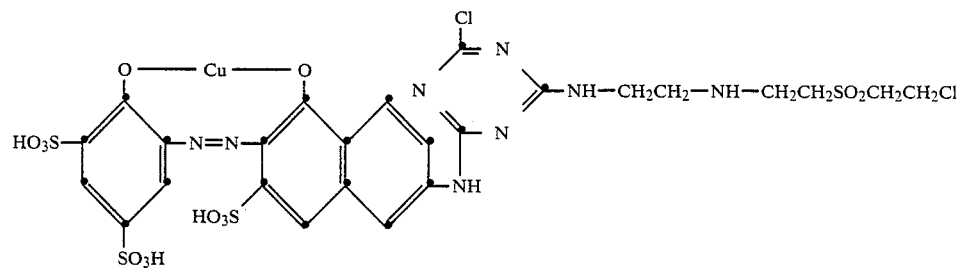

It is precipitated with sodium chloride, is filtered off and is dried at 55°-60°.

EXAMPLE 67

58.1 parts of the copper complex dye prepared by diazotization of 2-aminophenol-4,6-disulfonic acid and coupling onto 2-amino-5-naphthol-7-sulfonic acid with subsequent coppering in acetic acid solution are dissolved in water under neutral conditions. To this dye solution is added dropwise at 0° in the course of 20 minutes 14.2 parts of 2,4,6-trifluoro-1,3,5-triazine. During the reaction the pH is maintained at 4.5 to 5.5 by the dropwise addition of 50 parts of 2N sodium carbonate solution. 30 parts of N-(2-β-chloroethylsulfonylethyl)-ethylenediamine dihydrochloride are then added, the temperature is raised to about 15° and the pH is maintained at 4.5 to 5.0 by the addition of 100 parts of 2N sodium carbonate solution a little at a time. The resulting ruby red reactive dye has the following formula:

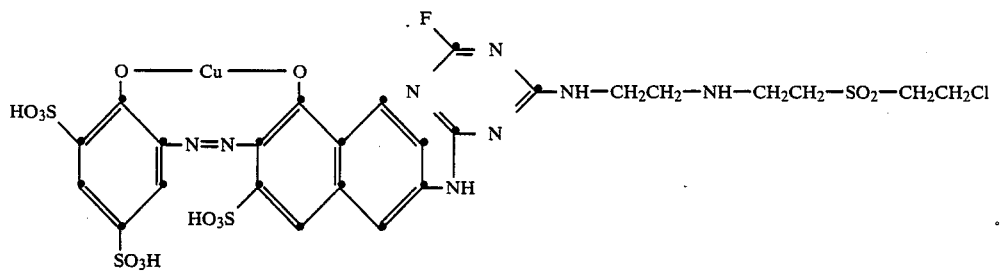

It is precipitated with sodium chloride, is filtered off and is dried at 55° to 60°.

Similarly useful reactive dyes according to the invention are obtained on using as starting dyes not the copper complex dye from 2-aminophenol-4,6-disulfonic acid and 2-amino-5-naphthol-7-sulfonic acid but the copper complex dyes of the dyes prepared from the diazo and coupling components listed hereinafter and otherwise carrying out the reactions with cyanuric chloride and α-ethoxycarbonyl-β-(β'-chloroethylsulfonyl)-ethylamine hydrochloride as described above.

Diazo components:
2-aminophenol-4-sulfonic acid
2-aminophenol-5-sulfonic acid
6-nitro-2-aminophenol-4-sulfonic acid 4-nitro-2-aminophenol-6-sulfonic acid
4-chloro-2-aminophenol-6-sulfonic acid
2-amino-4-methylphenol-6-sulfonic acid
2-amino-4-acetaminophenol-6-sulfonic acid
1-amino-2-naphthol-4-sulfonic acid
6-nitro-1-amino-2-naphthol-4-sulfonic acid Coupling components
1-amino-5-naphthol-7-sulfonic acid
1-amino-8-naphthol-4-sulfonic acid
1-amino-8-naphthol-6-sulfonic acid
2-(N-methylamino)-5-naphthol-7-sulfonic acid
2-(N-ethylamino)-5-naphthol-7-sulfonic acid
2-(N-β-hydroxyethylamino-5-naphthol-7-sulfonic acid
2-amino-8-naphthol-6-sulfonic acid
2-(N-methylamino)-8-naphthol-6-sulfonic acid
2-(N-ethylamino)-8-naphthol-6-sulfonic acid
1-amino-8-naphthol-3,6-disulfonic acid
1-amino-8-naphthol-4,6-disulfonic acid
2-amino-5-naphthol-1,7-disulfonic acid
2-amino-8-naphthol-3,6-disulfonic acid.

EXAMPLE 68

30 parts of N-(2-β-chloroethylsulfonylethyl)-ethylenediamine dihydrochloride are added in powder form to a suspension of 79.4 parts of the copper complex of 7-[6'-(3'',5''-dichloro-2'',4'',6''-triazinylamino)-2'-hydroxy-4'-sulfo-1-naphthylazo]-1-amino-8-hydroxynaphthalene-2,4-disulfonic acid in about 800 parts of water at 0° to 5° and pH 6.5. The temperature is raised to 30° to 40 ° and is maintained at that level for 4 hours. At the same time the pH is maintained at 4.0 to 4.5 by the dropwise addition of 100 parts of 2N sodium carbonate solution. The reaction is complete when the pH stays at a constant 4.5. The synthesized blue reactive dye has the following structure

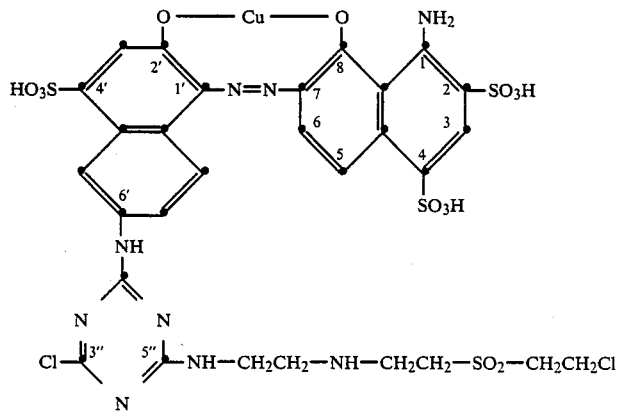

It is either evaporated to dryness at 55°-60° in vacuo or is precipitated with sodium chloride.

The copper complex of 7-[6'-(3'',5''-dichloro-2'',4'',6''-triazinylamino)-2'-hydroxy-4-sulfo-1'-naphthylazo]-1-amino-8-hydroxynaphthalene-2,4-disulfonic acid used as the starting dye is prepared as follows:

60.8 parts of 6-nitro-1-diazo-4-sulfo-2-naphtholate are coupled at 0° to 5° with 63.8 parts of 1-amino-8-hydroxynaphthalene-2,4-disulfonic acid in the presence of sodium carbonate. To reduce the nitro group, a solution of 27.3 parts of sodium sulfide in water is added dropwise to the dye solution at about 40°-50°, and the mixture is stirred for 1-2 hours. The amino-containing dye is precipitated with sodium chloride, is filtered off and is dissolved in about 800 parts of water, and the solution is brought to pH 5-5.3 with acetic acid. 40 parts of copper acetate or 50 parts of copper sulfate are added and the mixture is stirred at 20°-30° for 5 hours. The resulting copper complex dye is precipitated with sodium chloride, is filtered off and is dissolved in 800 parts of water under neutral conditions. The dye solution is then added at 0°-5° to a suspension of 37.0 parts of cyanuric chloride, which has been prepared by dissolving the cyanuric chloride in 200 parts of acetone and dropwise addition of this solution to 500 parts of ice. The mixture is stirred at 0°–5° for 1–2 hours until diazotizable amino groups are no longer detectable.

Similarly useful reactive dyes according to the invention are obtained on replacing the 6-nitro-1-diazo-4-sulfonaphtholate by the diazo compounds of the following amines;
4-nitro-2-amino-1-hydroxynaphthalene-6-sulfonic acid
6-nitro-2-aminophenol-4-sulfonic acid
4-nitro-2-aminophenol-6-sulfonic acid.

EXAMPLE 69

30 parts of N-(2-β-chloroethylsulfonylethyl)-ethylenediamine dihydrochloride are added in powder form to a suspension of 76.1 parts of the copper complex of 7-[6'-(3'',5''- difluoro-2'',4'',6''-triazinylamino)-2'-hydroxy-4'-sulfo-1'-naphthylazo]1-amino-8-hydroxynaphthalene -2,4-disulfonic acid in about 800 parts of water at 0° to 5° and at pH 6.5. The temperature is raised to 5° to 10° and is maintained at that level for 2 hours. At the same time the pH is maintained at 4.0 to 4.5 by the dropwise addition of 100 parts of 2N sodium carbonate solution. The reaction is complete when the pH stays at a constant 4.5. The synthesized blue reactive dye has the following structure

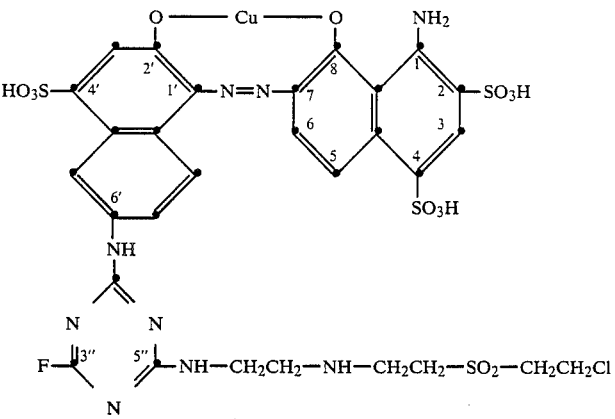

it is either evaporated to dryness at 40° in vacuo or is precipitated with sodium chloride.

EXAMPLE 70

30 parts of N-(2-β-chloroethylsulfonylethyl)-ethylenediamine dihydrochloride are added in powder form to a neutral dye suspension of 82.4 parts of the copper complex of N-(2-hydroxy-4-sulfophenyl)-N'-(2'-carboxy-4'-sulfophenyl)-ms-[4''-(3''',5'''-dichloro-2''',4''',6'''-triazinylamino)-2''-sulfophenyl]-formazan in about 800 parts of water, the temperature being about 0°–5°. The temperature is then raised to 30°–40° for 4 hours and during this time the pH is maintained at 4.0–4.5 by the addition of dilute sodium hydroxide solution a little at a time. As soon as no further sodium hydroxide solution is required, ie. as soon as the pH stays constant, the synthesized blue reactive dye is isolated by spray-drying at 55°–60° or by salting out. It has the following structure:

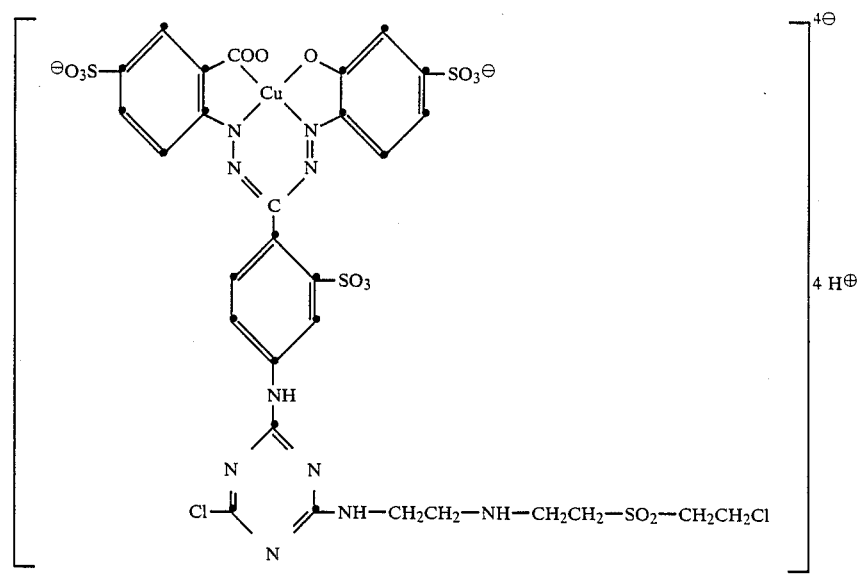

EXAMPLE 71

30 parts of N-(2-β-chloroethylsulfonylethyl)-ethylenediamine dihydrochloride are added in powder form to a neutral dye suspension of 78.1 parts of the copper complex of N-(2-hydroxy-4-sulfophenyl)-N'-(2'-carboxy-4'-sulfophenyl)-ms-[4''-(3''',5'''-difluoro-2''',4''',6'''-triazinylamino)-2''-sulfophenyl]-formazan in about 800 parts of water, the temperature being about 0°–5°. The temperature is then raised to 0°– ° for 2 hours and during this time the pH is maintained at 4.0–4.5 by the addition of dilute sodium hydroxide solution a little at a time. As soon as no further sodium hydroxide solution is required, ie. as soon as the pH stays constant, the synthesized blue reactive dye is isolated by spray-drying at 40° or by salting out. It has the following structure:

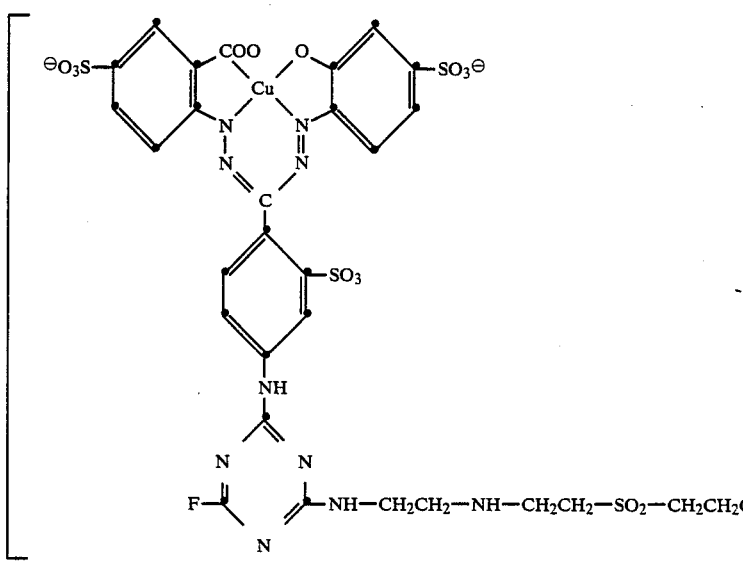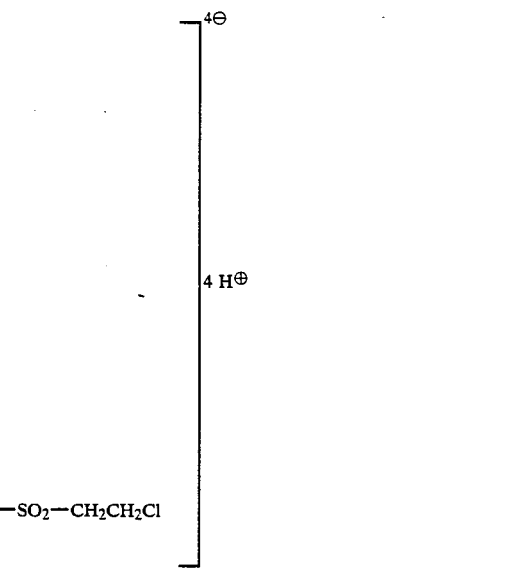

The copper complex of N-(2-hydroxy-4-sulfophenyl)-N'-(2''-carboxy-4'''-sulfophenyl)-ms-[4''-(3''',5'''-dichloro-2''',4''',6'''-triazinylamino)-2-sulfophenyl]-formazan used as the starting dye is prepared as follows: 46.4 parts of 2-carboxyphenyl-hydrazine-4-sulfonic acid and 48.6 parts of 4-acetaminobenzaldehyde-2-sulfonic acid are condensed in aqueous solution, and the resulting hydrazone is coupled at 0°–5° with the diazo compound of 37.8 parts of 1-amino-2-hydroxybenzene-4-sulfonic acid in the presence of sodium carbonate. The resulting formazan is brought to pH 5–5.3 with acetic acid and is converted into the copper complex by heating at 40°–50° for 5 hours in the presence of copper-donating agents, for example 40 parts of copper acetate or 50 parts of copper sulfate. The copper complex is precipitated with sodium chloride and is dissolved in about 800 ml of water under neutral conditions. The dye solution is added at 0°–5° to a suspension of 37.0 parts of cyanuric chloride, which is prepared by dissolving the cyanuric chloride in 200 parts of acetone and precipitating with 500 parts of ice. The mixture is stirred at 0°–5° or 1–2 hours until the reaction has ended.

Similarly useful reactive dyes according to the invention are obtained on preparing formazans from the hydrazine, aldehyde and diazo components listed hereinafter, at least one acetamino group needing to be present either in the aldehyde or the diazo component, converting the formazans into the copper complex, hydrolzying the acetamino group, reacting the dyes with cyanuric chloride and otherwise proceeding as indicated above. The components in this synthesis need to be chosen to be such that at least three sulfo groups are present per dye molecule.

If there is a hydrolyzable acetamino group present in both the aldehyde and the diazo component, reactive radicals can be introduced into the dye in duplicate.

Hydrazine components:
  2-hydroxyphenylhydrazine
  6-nitro-2-hydroxyphenylhydrazine
  4-chloro-2-carboxyphenylhydrazine
  5-nitro-2-carboxyphenylhydrazine
  4-methoxy-2-carboxyphenylhydrazine
  4-nitro-2-hydroxy-6-sulfophenylhydrazine
  6-nitro-2-hydroxy-4-sulfophenylhydrazine
  2-carboxy-5-sulfophenylhydrazine
  2-hydroxy-6-carboxy-4-sulfophenylhydrazine
  2-hydroxy-4,6-disulfophenylhydrazine
  2-hydroxy-4-sulfonaphthylhydrazine
  2-hydroxy-4,6'-disulfonaphthyl-1-hydrazine
Aldehyde components:
  benzaldehyde
  4-methylbenzaldehyde
  benzaldehyde-2- or -3-or -4-sulfonic acid
  benzaldehyde-2,4-disulfonic acid
  2- or 3- or 4-nitrobenzaldehyde
  2-chlorobenzaldehyde-5-sulfonic acid
  2- or 3- or 4-acetaminobenzaldehyde
  3-acetaminobenzaldehyde-4-sulfonic acid
  5-acetaminobenzaldehyde-2-sulfonic acid
Diazo components:
  1-amino-3-acetamino-2-hydroxybenzene-5-sulfonic acid
  1-amino-5-acetamino-2-hydroxybenzene-3-sulfonic acid
  3-chloro-1-amino-2-hydroxybenzene-5-sulfonic acid
  5-nitro-1-amino-2-hydroxybenzene-3-sulfonic acid
  5-nitro-1-amino-2-hydroxybenzene-4-sulfonic acid
  1-amino-2-hydroxybenzene-4,6-disulfonic acid.

Methods analogous to those described can also be used to prepare the dyes listed in the following Table, which dye cotton in the indicated shade.

| Examples | Shade |
|---|---|
| 72 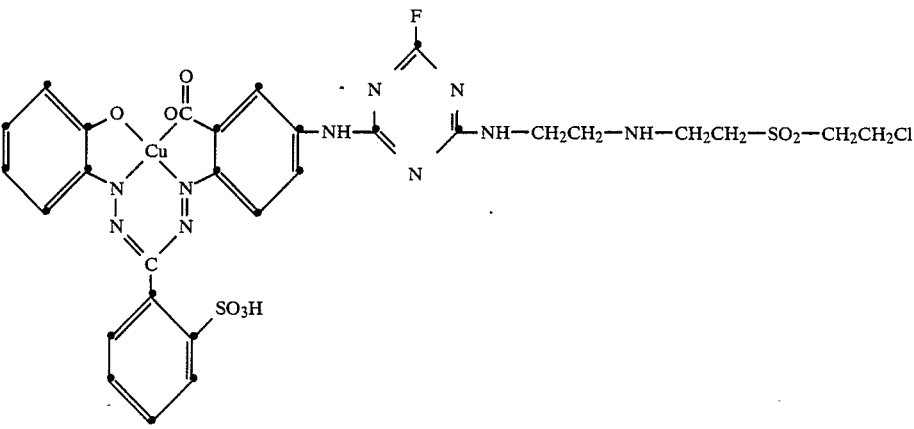 | blue |
| 73 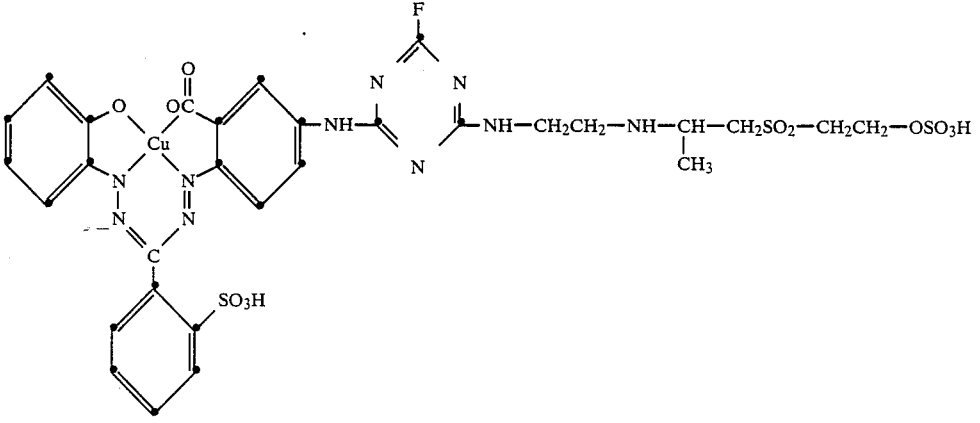 | blue |
| 74 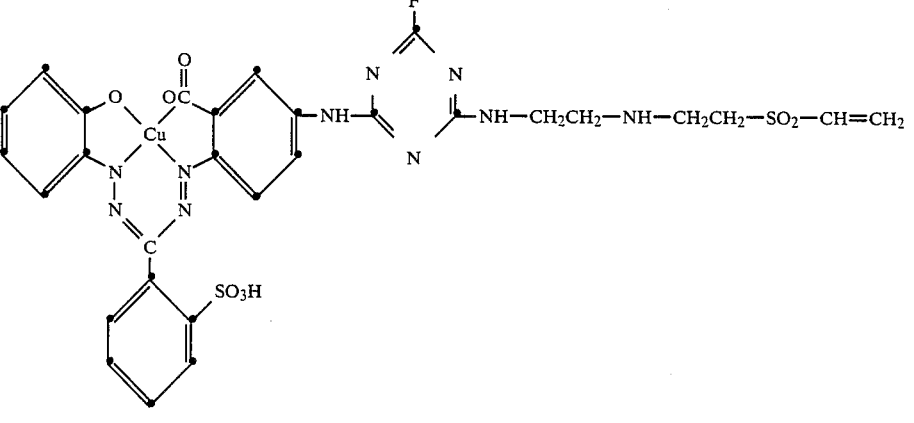 | blue |

| Examples | | Shade |
|---|---|---|
| 75 | 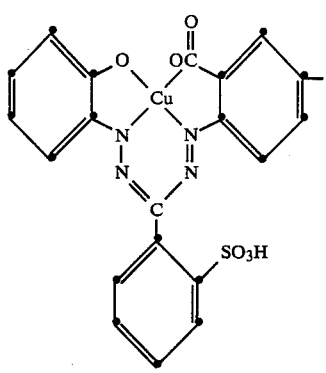 | blue |
| 76 | 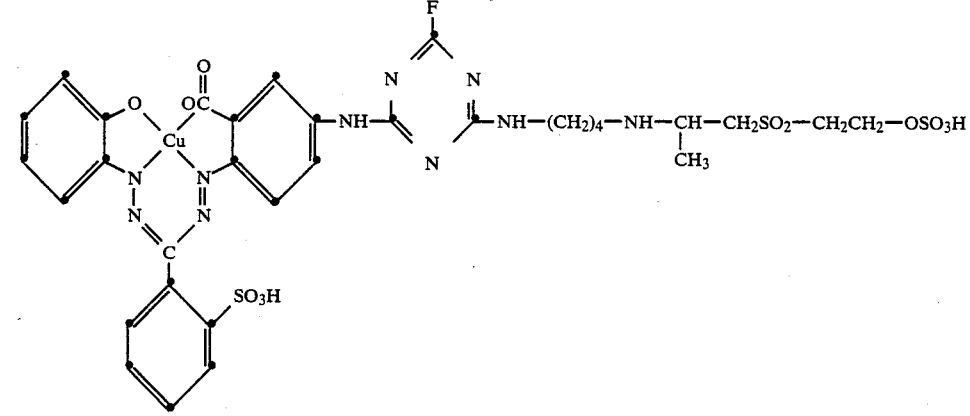 | blue |

EXAMPLE 77

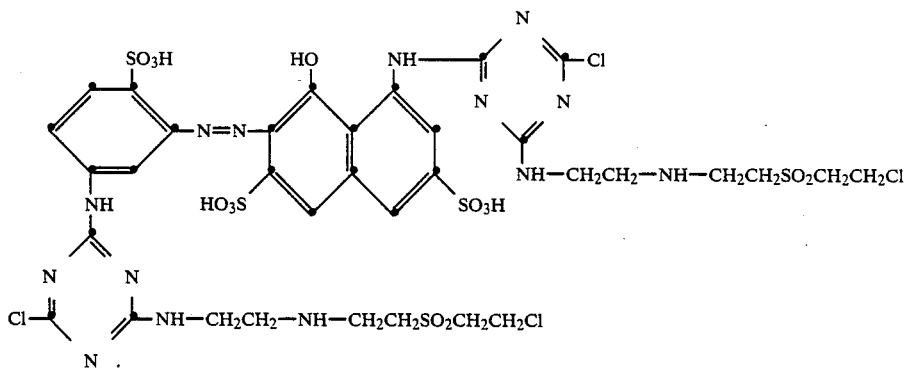

An aqueous suspension of 60 parts of N-(2-β-chloroethylsulfonylethyl)-ethylenediamine dihydrochloride is added at 0°–5° to an aqueous suspension of 81.4 parts of the N,N'-bis-(3,5-dichloro-2,4,6-triazinyl) compound of 7-(5'-amino-2'-sulfophenylazo)-1-amino-8-naphthol-3,6-disulfonic acid. The temperature is then raised to 30°–40° and is maintained at that level for 3–4 hours, and at the same time a solution of 100 parts of 2N sodium carbonate solution is added dropwise a little at a time in order to maintain the pH at 4.0–4.5. When the pH stays constant, the reaction is complete. The resulting bluish red reactive dye is then either evaporated at 55°–60° in vacuo or precipitated with sodium chloride. It has the following structure The N,N'-bis-(3,5-dichloro-2,4,6-triazinyl) compound of 7-(5'-amino-2'-sulfophenylazo)-amino-8-naphthol-3,6-disulfonic acid, which is used as the starting dye, is obtained as follows: at a temperature of 0°–5° and pH 6–7 a neutral solution of 37.6 parts of 2,4-diaminobenzenesulfonic acid is reacted with a suspension of 37.0 parts of cyanuric chloride and a neutral solution of 63.8 parts of 1-amino-8-naphthol-3,6-disulfonic acid is reacted with a suspension of 37.0 parts of cyanuric chloride. In both cases the pH of 6–7 is maintained by the dropwise addition of 100 parts of 2N sodium carbonate solution in each case. The diazo component 2-amino-5-(3″,5″-dichloro-2″,4″,6″-triazinylamino)-benzenesulfonic acid is diazotized in conventional manner at 0°–5° in hydrochloric acid solution with sodium nitrite and is then combined with the coupling component 1-(3‴,5‴-dichloro-2‴,4‴,6‴-triazinylamino)-8-naphthol-3,6-disulfonic acid to form the monoazo dye.

Similarly useful reactive dyes according to the invention are obtained by replacing, in the preparation of the starting dye, the condensation product of 1-amino-8-naphthol-3,6-disulfonic acid with cyanuric chloride by the condensation products with cyanuric chloride of the coupling components mentioned in Example 1 and otherwise proceeding as described above.

Example 77 is repeated, except that the condensation product of 2,4-diaminobenzenesulfonic acid with cyanuric chloride, which was used as the diazo component in the preparation of the starting dye, is replaced by the corresponding condensation products of cyanuric chloride with 2,5-diaminobenzenesulfonic acid or 2,5-diaminobenzene-1,4-disulfonic acid, likewise affording useful dyes according to the invention.

EXAMPLE 78

Example 77 is repeated, except that the 81.4 parts of N,N′-bis-(3,5-dichloro-2,4,6-triazinyl) compound of 7-(5′-amino-2′-sulfophenylazo)-1-amino-8-naphthol-3,6-disulfonic acid are replaced by 78.1 parts of N,N′-bis-(3,5-difluoro-2,4,6-triazinyl) compound of 7-(5′-amino-2′-sulfophenylazo)-1-amino-8-naphthol-3,6-disulfonic acid, likewise affording useful dyes according to the invention.

EXAMPLE 79

A neutral solution of 72.8 parts of the copper complex of the dye 6-amino-1,2′,8′-trihydroxy-2,1′-azonaphthalene-3′,4,6′,8-tetrasulfonic acid in 400 parts of water is added at 0° to 5° to a suspension of 18.5 parts of cyanuric chloride, which has been prepared by dissolving in 70 parts of warm acetone and discharging with stirring onto 300 parts of ice. The hydrochloric acid formed in the course of the reaction is neutralized by the dropwise addition of 50 parts of 2N sodium hydroxide solution (pH 5.5–6.5). 30 parts of N-(2-β-chloroethylsulfonylethyl)-ethylenediamine dihydrochloride are then added in powder form. The temperature is raised to 40° in about ½ hour and it is maintained at that level for 3 hours. At the same time the pH is maintained at 4.0 to 4.5 by addition of 17 g of sodium carbonate. The resulting blue reactive dye of the formula is salted out with sodium chloride, is filtered off and is dried at 60° in vacuo.

The copper complex dye used as a starting material is prepared in accordance with the instructions in German Patent 1,117,235 as follows:

81.8 parts of the o-benzenesulfonyl ester of 1-amino-8-naphthol-3,6-disulfonic acid are diazotized and are coupled with 72.2 parts of 2-acetamino-5-naphthol-4,8-disulfonic acid under alkaline conditions due to sodium carbonate. The resulting monoazo dye is converted into the copper complex in conventional manner by oxidative coppering with copper sulfate and hydrogen peroxide in acetic acid solution, and the benzenesulfonyl and acetyl groups are then split off by hydrolysis.

Example 79 is repeated, except that, in the preparation of the starting dye, the diazo component is replaced by molar amounts of the diazo components below, likewise affording useful dyes according to the invention:
o-benzenesulfonyl 1-amino-8-naphthol-4,6-disulfonate
o-benzenesulfonyl 1-amino-8-naphthol-4,7-disulfonate
2-aminophthalene-4,8-disulfonic acid
2-amino-6-nitronaphthalene-4,8-disulfonic acid
2-aminoaphthalene-4,6,8-trisulfonic acid
2-aminoaphthalene-6-sulfonic acid
2-aminoaphthalene-8-sulfonic acid Replacing, in the preparation of the starting dye, the coupling component 2-acetamino-5-naphthol-4,8-disulfonic acid by molar amounts of the N-acetyl compound of the following coupling components likewise produces useful dyes according to the invention:
2-amino-8-naphthol-6-sulfonic acid
2-amino-5-naphthol-7-sulfonic acid
2-amino-5-naphthol-1,7-disulfonic acid
2-amino-8-naphthol-3,6-disulfonic acid.

EXAMPLE 80

70.2 parts of the disazo dye 1-amino-2-(4′-sulfophenylazo)-7-(2″-sulfo-5″-aminophenylazo)-8-naphthol-3,6-disulfonic acid are reacted at 0° to 5° in the form of a neutral solution with a suspension of 18.5 parts of cyanuric chloride which have been dissolved in 110 parts of acetone and reprecipitated with 250 parts of ice. The reaction takes place at pH 6.0 to 6.5, the pH being maintaied by dropwise addition of 50 parts of 2N sodium carbonate solution. Afterwards 30 parts of N-(2-β-chloroethylsulfonylethyl)-ethylenediamine dihydrochloride are added in powder form, and the mixture is heated to 30° to 40° while the pH is maintained at 4.0 to 4.5 by dropwise addition of 100 parts of 2N sodium carbonate solution. The resulting dye of the structure

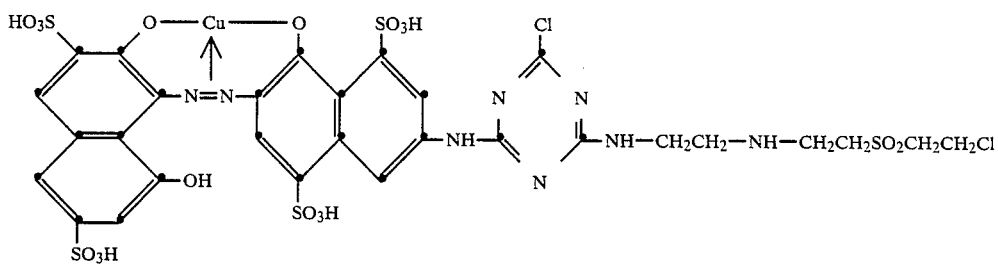

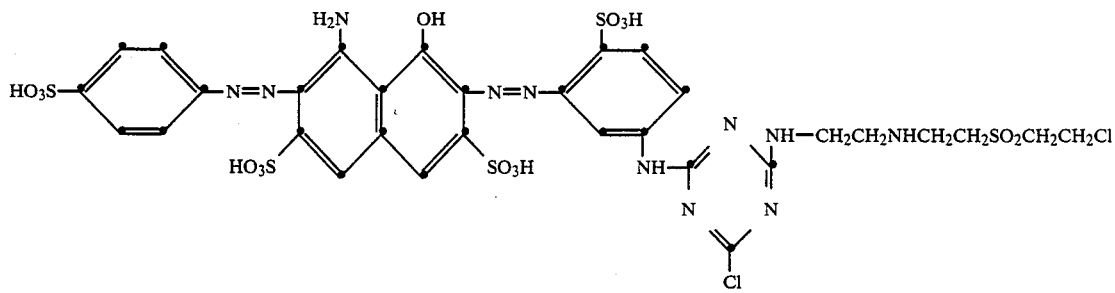

is isolated by salting out or by spray-drying.

The disazo dye used as starting material can be prepared as follows:

The diazo compound of ;b 34.6 parts of sulfanilic acid is coupled first in an acid medium at pH 2-4 with 63.8 parts of 1-amino-8-naphthol-3,6-disulfonic acid and then in a second stage with the diazo compound of 46.0 parts of 2-amino-4-acetaminobenzenesulfonic acid under alkaline conditions due to sodium carbonate. The acetyl group of the disazo dye is hydrolyzed by heating to 90°-100° in the presence of excess sodium hydroxide solution.

Similar useful dyes according to the invention are obtained on replacing the diazo dye used as the starting dye by the following dyes and otherwise proceeding as described above.

1-amino-2-(2'-sulfophenylazo)-7-(2''-sulfo-5-aminophenylazo)-8-naphthol-3,6-disulfonic acid 1-amino-2-(2',4'-disulfophenylazo)-7-(2''-sulfo-5''-aminophenylazo)-8-naphthol-3,6-disulfonic acid 1-amino-2-(2',5'-disulfophenylazo)-7-(2'-sulfo-5''-aminophenylazo)-8-naphthol-3,6-disulfonic acid 1-amino-2-(4'-sulfophenylazo)-7-(2''-sulfo-4''-aminophenylazo)-8-naphthol-3,6-disulfonic acid 1-amino-2-(2',5'-disulfophenylazo)-7-(2''-sulfo-4''-aminophenylazo)-8-naphthol-3,6-disulfonic acid 1-amino-2-(2'-sulfo-4'-aminophenylazo)-7-(4''-sulfophenylazo)-8-naphthol-3,6-disulfonic acid 1-amino-2-(2',5'-disulfo-4-aminophenylazo)-7-phenylazo-8-naphthol-3,6-disulfonic acid 1-amino-2-(2'-sulfo-5'-aminophenylazo)-7-(4''-sulfophenylazo)-8-naphthol-3,6-disulfonic acid 1-amino-2-(2'-sulfo-5'-aminophenylazo)-7-(2''-sulfophenylazo)-8-naphthol-3,6-disulfonic acid 1-amino-2-(2'-sulfo-5'-aminophenylazo)-7-(2'',5''-disulfophenylazo)-8-naphthol-3,6-disulfonic acid.

Example 80 is repeated, except that in the preparation of the abovementioned disazo dyes 1-amino-8-naphthol-3,6-disulfonic acid is replaced by 1-amino-8-naphthol-4,6-disulfonic acid, likewise affording useful dyes according to the invention.

EXAMPLE 81

14.2 parts of 2,4,6-trifluoro-1,3,5-triazine are added at 0° to a neutral solution of 70.2 parts of the disazo 1-amino-2-(4'-sulfophenylazo)-7-(2''-sulfo-5''-aminophenylazo)-8-naphthol-3,6-disulfonic acid in the course of 20 minutes. The reaction takes place at pH 6.0 to 6.5, the pH being maintained by dropwise addition of 50 parts of 2N sodium carbonate solution. Afterwards 30 parts of N-(2-β-chloroethylsulfonylethyl)-ethylenediamine dihydrochloride are added in powder form, and the mixture is heated to 0° to 10° while the pH is maintained at 4.0 to 4.5 by the dropwise addition of 100 parts of 2N sodium carbonate solution. The resulting dye of the structure

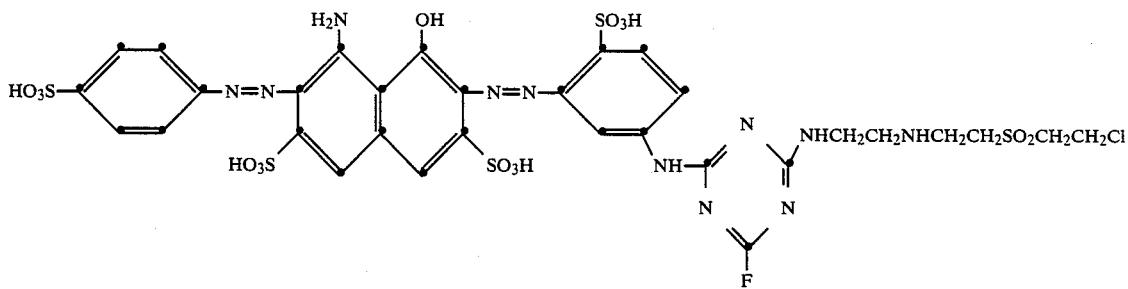

1-amino-2-(2'-sulfo-4'-aminophenylazo)-7-(2'',5''-disulfophenylazo)-8-naphthol-3,6-disulfonic acid is isolated by salting out or by spray-drying.

Methods analogous to those described can also be used to prepare the dyes listed in the table below, which dye cotton in the indicated shade.

| Examples | Shade |
|---|---|
| 82 ... navy | navy |
| 83 ... navy | navy |
| 84 ... navy | navy |

-continued

Examples | Shade
---|---

85: Structure with H$_2$C=HC—O$_2$S—(phenyl with Br)—N=N—(naphthyl with HO, NH$_2$, HO$_3$S, SO$_3$H)—N=N—(phenyl with SO$_3$H)—NH—(triazine with Cl)—NH—CH$_2$CH$_2$CH$_2$—NH—CH(CH$_3$)—CH$_2$SO$_2$CH$_2$CH$_2$OSO$_3$H | navy

EXAMPLE 86

72.0 parts of the disazo dye 1-amino-2-(2'-sulfo-5'-aminophenylazo)-7-(2''-sulfo-5''-aminophenylazo)-8-naphthol-3,6-disulfonic acid are reacted at 0° to 5° in the form of a neutral solution with a suspension of 37 parts of cyanuric chloride which have been reprecipitated from 110 parts of acetone with 250 parts of ice. The reaction takes place at pH 6.0 to 6.5, the pH being maintained by dropwise addition of 100 parts of 2N sodium carbonate solution. Afterwards 60 parts of N-(2-β-chloroethylsulfonylethyl)-ethylenediamine dihydrochloride are added in powder form, and the mixture is heated to 30° to 40° while the pH is maintained at 4.5 to 5 by dropwise addition of 200 parts of 2N sodium carbonate solution. The resulting dye of the structure

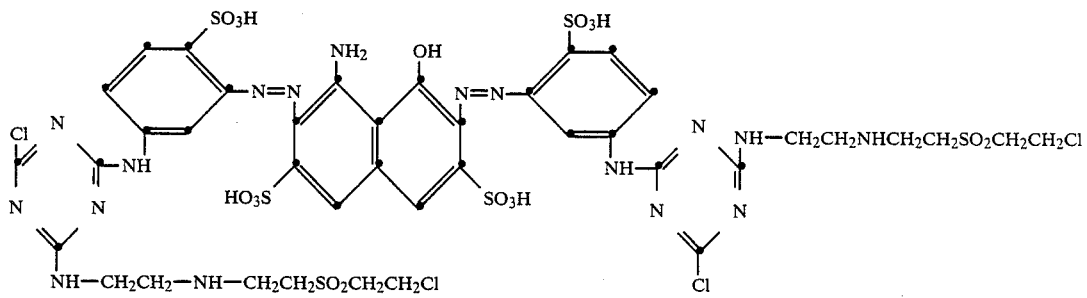

is isolated by salting out or by spray-drying.

The disazo dye used as the starting material can be prepared as follows:

The diazo compound of 46.0 parts of 2-amino-4-acetaminobenzenesulfonic acid is coupled first in an acid medium at pH 2–4 with 63.8 parts of 1-amino-8-naphthol-3,6-disulfonic acid and then in a second stage with the diazo compound of 46.0 parts of 2-amino-4-acetaminobenzenesulfonic acid under alkaline conditions due to sodium carbonate. The acetyl groups of the disazo dye are hydrolyzed by heating to 90°–100° in the presence of excess sodium hydroxide solution.

Similarly useful dyes according to the invention are obtained on replacing the diazo dye used as starting dye by the following dyes and otherwise proceeding as described above:

1-amino-2-(2'-sulfo-4'-aminophenylazo)-7-(2''-sulfo-4''-aminophenylazo)-8-naphthol-3,6-disulfonic acid 1-amino-2-(2',5'-disulfo-4'-aminophenylazo)-7-(2'',5''-disulfo-4''-aminophenylazo)-8-naphthol-3,6-disulfonic acid 1-amino-2-(2',4'-disulfo-5'-aminophenylazo)-7-(2'',4''-disulfo-5''-aminophenylazo)-8-naphthol-3,6-disulfonic acid.

Example 86 is repeated, except that in the preparation of the abovementioned disazo dyes 1-amino-8-naphthol-3,6-disulfonic acid is replaced by 1-amino-8-naphthol-4,6-disulfonic acid, likewise affording useful dyes according to the invention.

EXAMPLE 87

28.2 parts of 2,4,6-trifluoro-1,3,5-triazine are added at 0° to a neutral solution of 72.0 parts of the disazo dye 1-amino-2-(2'-sulfo-5'-aminophenylazo)-7-(2''-sulfo-5''-aminophenylazo)-8-naphthol-3,6-disulfonic acid in the course of 20 minutes. The reaction takes place at pH 6.0 to 6.5, the pH being maintained by dropwise addition of 100 parts of 2N sodium carbonate solution. Afterwards 60 parts of N-(2-⊕-chloroethylsulfonylethyl)-ethylenediamine dihydrochloride are added in powder form, and the mixture is warmed to 0° to 10° while the pH is maintained at 4.5 to 5 by dropwise addition of 200 parts of 2N sodium carbonate solution. The resulting dye of the structure

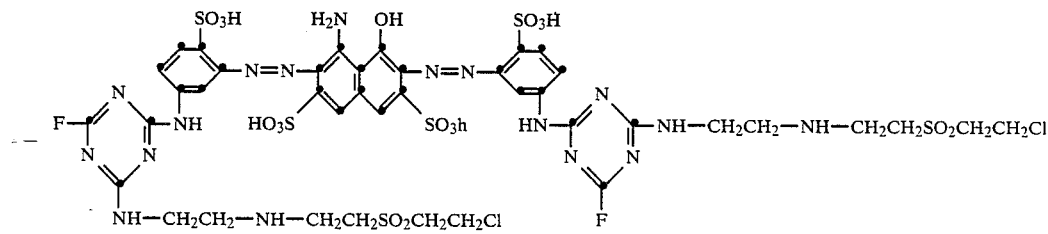

is isolated by salting out or by spray-drying.

EXAMPLE 88

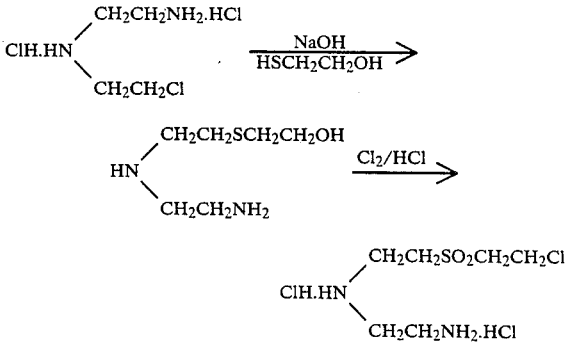

106 parts of 2-mercaptoethanol are presented at room temperature in a 3-liter plane joint flask, and 545 parts of 30% sodium hydroxide solution are added dropwise at room temperature at 35° in the course of 20 minutes.

265.5 parts of N-(2-chloroethyl)-ethylenediamine dihydrochloride dissolved in about 140 parts of water are then added dropwise at 45° to 50° in the course of 30 minutes. The reaction solution is then stirred at 78° for 2 hours and is then acidified at 30° with 690 parts of 37% concentrated hydrochloric acid, and 215 parts of chlorine gas are passed in at 30° to 40° with vigorous stirring in the course of 2 hours. After a further 2 hours of stirring the excess chlorine is destroyed at room temperature with about 2 parts of sodium bisulfite. The reaction solution is freed from salt of filtering through a frit. The mother liquor is evaporated to dryness. Yield: 387 parts of wise (sic) powder=99% of theory.

| Analysis | Calculated | Found |
|---|---|---|
| C | 25.06% | 24.60% |
| H | 5.96% | 5.90% |
| Cl | 36.98% | 36.20% |
| Cl (ionic) | 24.65% | 24.30% |
| N | 9.74% | 9.50% |
| S | 11.15% | 11.00% |

Dyeing method I 2 parts of the dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

Dyeing method II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

Dyeing method III 8 parts of the reactive dye obtained in Example 1 are dissolved in 400 parts of water; to this solution are added 1,400 parts of a solution which contain per liter 100 g of sodium sulfate. 100 parts of a cotton fabric are introduced at 25° into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

Dyeing method IV 4 parts of the reactive dye obtained in Example 1 are dissolved in 50 parts of water. To this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a non-ionic detergent for a quarter of an hour, is rinsed once more and is dried.

Dyeing method V 6 parts of the reactive dye obtained in Example 1 are dissolved in 50 parts of water. To this solution are added 50 parts of a solution which contains per liter 16 g of sodium hydroxide and 0.04 liter of 38° Be sodium silicate. The resulting solution is applied to a cotton fabric on a pad-mangle in such a way that its weight increases by 70%, and the fabric is then wound onto a beam. In this state the cotton fabric is left at room temperature for 10 hours. The dyed fabric is then rinsed, is soaped off at the boil with a nonionic detergent for a quarter of an hour, is rinsed once more and is dried.

I claim:

1. A compound of the formula

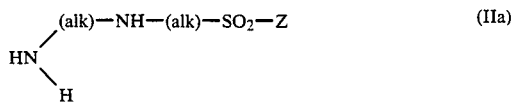

(IIa)

in which the alks independently of each other are $C_2$–$C_6$-alkylene and Z is β-halogenoethyl, vinyl, β-sulfatoethyl, β-thiosulfatoethyl or β-acetoxyethyl.

* * * * *